United States Patent
Ji et al.

(10) Patent No.: US 10,341,976 B2
(45) Date of Patent: *Jul. 2, 2019

(54) ACQUIRING ON-DEMAND SYSTEM INFORMATION FOR A CELLULAR NETWORK

(71) Applicant: QUALCOMM Incorporated, San Diego, CA (US)

(72) Inventors: Tingfang Ji, San Diego, CA (US); Gavin Bernard Horn, La Jolla, CA (US); John Edward Smee, San Diego, CA (US); Joseph Binamira Soriaga, San Diego, CA (US); Naga Bhushan, San Diego, CA (US); Jing Jiang, San Diego, CA (US); Kambiz Azarian Yazdi, San Diego, CA (US); Peter Pui Lok Ang, San Diego, CA (US); Peter Gaal, San Diego, CA (US); Krishna Kiran Mukkavilli, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,281

(22) Filed: Jul. 13, 2018

(65) Prior Publication Data

US 2018/0343631 A1    Nov. 29, 2018

Related U.S. Application Data

(60) Continuation of application No. 15/445,572, filed on Feb. 28, 2017, now Pat. No. 10,028,240, which is a
(Continued)

(51) Int. Cl.
*H04W 56/00* (2009.01)
*H04L 5/00* (2006.01)
(Continued)

(52) U.S. Cl.
CPC ......... *H04W 56/0015* (2013.01); *H04L 5/005* (2013.01); *H04L 5/0048* (2013.01);
(Continued)

(58) Field of Classification Search
CPC . H04W 56/0015; H04W 72/04; H04W 8/005; H04W 4/06; H04W 76/27;
(Continued)

(56) References Cited

U.S. PATENT DOCUMENTS 5,392,331 A    2/1995    Patsiokas et al.
9,781,693 B2   10/2017   Ji et al.
(Continued)

FOREIGN PATENT DOCUMENTS

EP    1562306 A1    8/2005
EP    1655982 A2    5/2006
(Continued)

OTHER PUBLICATIONS

European Search Report—EP17208651—Search Authority—Munich—dated Apr. 13, 2018.
(Continued)

*Primary Examiner* — Omar J Ghowrwal
(74) *Attorney, Agent, or Firm* — Qualcomm IP Dept.; James Hunt Yancey, Jr.

(57) ABSTRACT

Methods, systems, and devices are described for wireless communication. In one method, a method of wireless communication at a user equipment (UE) includes receiving a synchronization signal. The synchronization signal may be common to a plurality of cells within a network. The method further includes acquiring a timing of the network based on
(Continued)

the synchronization signal, and transmitting a pilot signal in response to acquiring the timing of the network. The pilot signal may identify the UE and be concurrently receivable by the plurality of cells within the network. Other aspects, features, and embodiments are also claimed and described.

26 Claims, 22 Drawing Sheets

Related U.S. Application Data division of application No. 14/728,756, filed on Jun. 2, 2015, now Pat. No. 9,936,469.

(60) Provisional application No. 62/083,071, filed on Nov. 21, 2014, provisional application No. 62/074,488, filed on Nov. 3, 2014.

(51) Int. Cl.
| | |
|---|---|
| *H04W 72/04* | (2009.01) |
| *H04W 8/00* | (2009.01) |
| *H04W 4/06* | (2009.01) |
| *H04W 76/27* | (2018.01) |
| *H04W 76/28* | (2018.01) |
| *H04W 76/20* | (2018.01) |
| *H04W 48/14* | (2009.01) |

(52) U.S. Cl.
CPC ............ *H04L 5/0058* (2013.01); *H04W 4/06* (2013.01); *H04W 8/005* (2013.01); *H04W 48/14* (2013.01); *H04W 56/00* (2013.01); *H04W 72/04* (2013.01); *H04W 76/20* (2018.02); *H04W 76/27* (2018.02); *H04W 76/28* (2018.02); *H04L 5/0023* (2013.01); *H04L 5/0051* (2013.01); *H04L 5/0053* (2013.01)

(58) Field of Classification Search
CPC ..... H04W 76/28; H04W 76/20; H04W 48/14; H04W 56/00; H04L 5/005; H04L 5/0058; H04L 5/0048; H04L 5/0023; H04L 5/0051; H04L 5/0053
See application file for complete search history.

(56) References Cited

U.S. PATENT DOCUMENTS

| | | | |
|---|---|---|---|
| 9,936,469 | B2 | 4/2018 | Ji et al. |
| 10,028,240 | B2 | 7/2018 | Ji et al. |
| 2003/0198212 | A1 | 10/2003 | Hoctor et al. |
| 2008/0159220 | A1 | 7/2008 | Kitchin et al. |
| 2010/0260169 | A1 | 10/2010 | Gheorghiu et al. |
| 2011/0014909 | A1 | 1/2011 | Han et al. |
| 2011/0064036 | A1 | 3/2011 | Tsai et al. |
| 2011/0267993 | A1 | 11/2011 | Seo et al. |
| 2011/0269463 | A1 | 11/2011 | Wang et al. |
| 2012/0039468 | A1 | 2/2012 | Ishida et al. |
| 2012/0176978 | A1 | 7/2012 | Kim |
| 2012/0329456 | A1 | 12/2012 | Makh et al. |
| 2013/0107827 | A1 | 5/2013 | Dinan |
| 2013/0315182 | A1 | 11/2013 | Kitou et al. |
| 2014/0227997 | A1 | 8/2014 | Kim et al. |
| 2015/0109969 | A1 | 4/2015 | Celebi et al. |
| 2015/0280876 | A1 | 10/2015 | You et al. |
| 2016/0037425 | A1 | 2/2016 | Van Lieshout et al. |
| 2016/0095158 | A1 | 3/2016 | Chuang et al. |
| 2016/0192386 | A1 | 6/2016 | Kim et al. |
| 2017/0230875 | A1 | 8/2017 | Tavildar et al. |

FOREIGN PATENT DOCUMENTS

| | | |
|---|---|---|
| JP | 2007243899 A | 9/2007 |
| JP | 2009111624 A | 5/2009 |
| WO | WO-2011136266 A1 | 11/2011 |
| WO | WO-2014129951 A1 | 8/2014 |

OTHER PUBLICATIONS

European Search Report—EP17208654—Search Authority—Munich—dated Apr. 6, 2018.
International Search Report and Written Opinion—PCT/US2015/057579—ISA/EPO—dated Feb. 3, 2016.
Marzetta T L., "Noncooperative Cellular Wireless with Unlimited Numbers of Base Station Antennas," IEEE Transactions on Wireless Communications, Nov. 2010, 11 pgs, vol. 9, No. 11, Institute of Electrical and Electronics Engineers.
Partial International Search Report and Written Opinion—PCT/US2015/057579—ISA/EPO—dated Oct. 14, 2016.
<span style="font-family: calibri;">Second Written Opinion from International Application No. PCT/US2015/057579, dated Nov. 4, 2016, 15 pages.
Taiwan Search Report—TW104135268—TIPO—dated Jul. 13, 2018.
Techopedia, What is a Keepalive?, [retrieved on Dec. 19, 2017], Retrieved from the Internet: URL: https://www.techopedia.com/definition/28979/keepalive, pp. 1-2.

ACQUIRING ON-DEMAND SYSTEM INFORMATION FOR A CELLULAR NETWORK

CROSS REFERENCES

The present Application for Patent is a Continuation of U.S. patent application Ser. No. 15/445,572 by Ji et al., entitled "Wireless Communication Systems and Methods Having a User Equipment-Centric Medium Access Control Layer" filed Feb. 28, 2017 which is a Divisional of U.S. patent application Ser. No. 14/728,756 by Ji et al., entitled "Wireless Communication Systems and Methods Having a User Equipment-Centric Medium Access Control Layer," filed Jun. 2, 2015, and claims priority to U.S. Provisional Patent Application No. 62/074,488 by Ji et al., entitled "Wireless Communication System Having a User Equipment-Centric Medium Access Control Layer," filed Nov. 3, 2014, and U.S. Provisional Patent Application No. 62/083,071 by Ji et al, entitled "Wireless Communication System Having a User Equipment-Centric Medium Access Control Layer," filed Nov. 21, 2014, assigned to the assignee hereof, and expressly incorporated by reference herein.

TECHNICAL FIELD

The present disclosure, for example, relates to wireless communication systems, and more particularly to a wireless communication system having a user equipment (UE)-centric medium access control (MAC) layer.

INTRODUCTION

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

In a wireless multiple-access communication system, each cell of a network may broadcast synchronization signals and system information for UEs to discover. Upon discovering the synchronization signals and system information broadcast by a particular cell, a UE may perform an initial access procedure to access the network via the cell. The cell via which the UE accesses the network may become the UE's serving cell. As the UE moves within the network, the UE may discover other cells (e.g., neighboring cells) and determine whether a handover of the UE to a neighboring cell is warranted.

BRIEF SUMMARY

The present disclosure generally relates to wireless communication systems, and more particularly to a wireless communication system having a UE-centric MAC layer. Wireless communication systems such as a Long Term Evolution (LTE) communication systems or LTE-Advanced (LTE-A) communication systems have a network-centric MAC layer. In a wireless communication system having a network-centric MAC layer, the network perpetually broadcasts synchronization signals and system information for UEs to discover. Upon discovering the synchronization signals and system information broadcast by a particular cell, a UE may perform an initial access procedure to access the network via the cell. Once connected to the network, the UE may discover other cells as it moves within the network. The other cells may broadcast different synchronization signals or system information.

A wireless communication system having a network-centric MAC layer may entail various signal broadcasts. These broadcasts consume power and may or may not be received or used by some or all of a cell's UEs. A wireless communication system having a network-centric MAC layer also places relatively more of the network processing on UEs (e.g., a UE identifies a first serving cell upon initially accessing the network, and then identifies and monitors handover targets (other serving cells) as part of its mobility management).

The present disclosure describes a wireless communication system having a UE-centric MAC layer. A wireless communication system having a UE-centric MAC layer may enable both UEs and base stations to conserve power among additional aspects and features as discussed in detail below. As further discussed below, UE-centric MAC features can enable and provide an edgeless network arrangement that can be useful in internet of everything (TOE) applications where data rates will be high.

In a first set of illustrative examples, a method of wireless communication at a UE is described. In one configuration, the method may include receiving a synchronization signal. The synchronization signal may be common to a plurality of cells within a network, and may be broadcast from the plurality of cells in a single frequency network (SFN) manner. The method may also include acquiring a timing of the network based on the synchronization signal, and transmitting a pilot signal in response to acquiring the timing of the network. The pilot signal may be concurrently receivable by the plurality of cells within the network.

In some embodiments, methods can have additional aspects and/or features. For example, a method may include receiving, in response to transmitting the pilot signal, at least one of: on-demand system information for the UE, an uplink allocation for the UE, or a downlink control channel message. Method embodiments, may also include transmitting a radio resource control (RRC) connection request to the network in response to receiving at least one of: the on-demand system information for the UE or the uplink allocation for the UE.

In some embodiments, the method may include entering an RRC connected state with the network subsequent to acquiring the timing of the network. In some configurations, the RRC connected state may include a first RRC connected state in a plurality of RRC connected states, the plurality of RRC connected states may include a second RRC connected state, and the method may include switching between at least the first RRC connected state and the second RRC connected state based at least in part on a determined traffic level. In some configurations, the first RRC connected state may be associated with a first discontinuous reception (DRX) cycle, the second RRC connected state may be associated with a second DRX cycle, and the second DRX cycle may differ from the first DRX cycle. In some configurations, the method may include determining the traffic level based on at least one of: a network-transmitted traffic level indicator; a network command; a status of a timer maintained at the UE; or a buffer status of the UE.

In some embodiments, the method may include, when operating in the first RRC connected state: transmitting, according to a first DRX cycle, at least one of: a scheduling request (SR), a buffer status report (BSR), a connected state pilot signal, or an indicator of a channel quality based on a reference signal configured for and received by the UE; and monitoring a grant channel for an identifier of the UE. In some configurations, the method may include receiving over the grant channel, in response to the monitoring, a paging signal or uplink grant associated with the identifier of the UE. In some configurations, the method may include, when operating in the first RRC connected state, measuring a reference signal, and determining to perform a constellation reselection based at least in part on the measuring. In some configurations, the reference signal may include a beamformed channel state information reference signal (CSI-RS) received from the network.

In some embodiments, the method may include, when operating in the second RRC connected state: transmitting a connected state pilot signal according to a second DRX cycle; and monitoring a grant channel for an identifier of the UE. In some configurations, the method may also include, when operating in the second RRC connected state: periodically listening for a keep alive signal from the network; and determining to perform a constellation reselection based at least in part on a measurement of the keep alive signal or a decoding error of the keep alive signal.

In some embodiments, the method may include receiving from the network a reselection command; selecting, in response to the reselection command, a new constellation; and transmitting the pilot signal in response to a second synchronization signal received from the new constellation.

In some embodiments of them method, the synchronization signal may include system information request configuration information including at least one of: an indication of a SIB request bandwidth, an indication of a SIB request timing, a portion of a constellation identifier, or network access barring information. In some embodiments of the method, the pilot signal may include a spatial signature. In some embodiments of the method, the pilot signal may include a sounding reference signal (SRS).

In a second set of illustrative examples, a device for wireless communication at a UE is described. In one configuration, the device may include means for receiving a synchronization signal, means for acquiring a timing of the network based on the synchronization signal, and means for transmitting a pilot signal in response to acquiring the timing of the network. The synchronization signal may be common to a plurality of cells within the network, and may be received as a SFN broadcast. The pilot signal may be concurrently receivable by the plurality of cells within the network. In some examples, the apparatus may further include means for implementing one or more aspects of the method for wireless communication described above with respect to the first set of illustrative examples.

In a third set of illustrative examples, another device for wireless communication at a UE is described. In one configuration, the device may include a processor, memory in electronic communication with the processor, and instructions stored in the memory. The instructions may be executable by the processor to receive a synchronization signal, acquire a timing of the network based on the synchronization signal, and transmit a pilot signal in response to acquiring the timing of the network. The synchronization signal may be common to a plurality of cells within a network, and may be received as a SFN broadcast. The pilot signal may be concurrently receivable by the plurality of cells within the network. In some examples, the instructions may also be executable by the processor to implement one or more aspects of the method for wireless communication described above with respect to the first set of illustrative examples.

In a fourth set of illustrative examples, a non-transitory computer-readable medium storing computer-executable code for wireless communication at a UE is described. The code may be executable by a processor to receive a synchronization signal, acquire a timing of the network based on the synchronization signal, and transmit a pilot signal in response to acquiring the timing of the network. The synchronization signal may be common to a plurality of cells within a network, and may be received as a SFN broadcast. The pilot signal may be concurrently receivable by the plurality of cells within the network. In some examples, the code may also be used to implement one or more aspects of the method for wireless communication described above with respect to the first set of illustrative examples.

In a fifth set of illustrative examples, a method of wireless communication at a base station is described. The method may include broadcasting a synchronization signal. The synchronization signal may be common to a plurality of cells within a network, and may be received as a SFN broadcast. The method may also include receiving a number of pilot signals from a first number of UEs. Each of the number of pilot signals may identify a UE in the first number of UEs and be concurrently receivable by the plurality of cells within the network.

In some embodiments, the method may include identifying, from the first number of UEs, a second number of UEs for which the base station will serve as a serving cell. In some configurations, the method may include transmitting information corresponding to the number of pilot signals to a central node, and receiving an indication of the second number of UEs from the central node.

In a sixth set of illustrative examples, a device for wireless communication at a base station is described. In one configuration, the device may include means for broadcasting a synchronization signal. The synchronization signal may be common to a plurality of cells within a network, and may be received as a SFN broadcast. The device may also include means for receiving a number of pilot signals from a first number of UEs. Each of the number of pilot signals may identify a UE in the first number of UEs and be concurrently receivable by the plurality of cells within the network. In some examples, the apparatus may further include means for implementing one or more aspects of the method for wireless communication described above with respect to the fifth set of illustrative examples.

In a seventh set of illustrative examples, another device for wireless communication at a base station is described. In one configuration, the device may include a processor, memory in electronic communication with the processor, and instructions stored in the memory. The instructions may be executable by the processor to broadcast a synchronization signal. The synchronization signal may be common to a plurality of cells within a network, and may be received as a SFN broadcast. The instructions may also be executable by the processor to receive a number of pilot signals from a first number of UEs. Each of the number of pilot signals may identify a UE in the first number of UEs and be concurrently receivable by the plurality of cells within the network. In some examples, the instructions may also be executable by the processor to implement one or more aspects of the method for wireless communication described above with respect to the fifth set of illustrative examples.

In an eighth set of illustrative examples, a non-transitory computer-readable medium storing computer-executable code for wireless communication at a base station is described. In one configuration, the code may be executable by a processor to broadcast a synchronization signal. The synchronization signal may be common to a plurality of cells within a network, and may be received as a SFN broadcast. The code may also be executable by the processor to receive a number of pilot signals from a first number of UEs. Each of the number of pilot signals may identify a UE in the first number of UEs and be concurrently receivable by the plurality of cells within the network. In some examples, the code may also be used to implement one or more aspects of the method for wireless communication described above with respect to the fifth set of illustrative examples The foregoing has outlined rather broadly the features and technical advantages of examples according to the disclosure in order that the detailed description that follows may be better understood. Additional features and advantages are below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
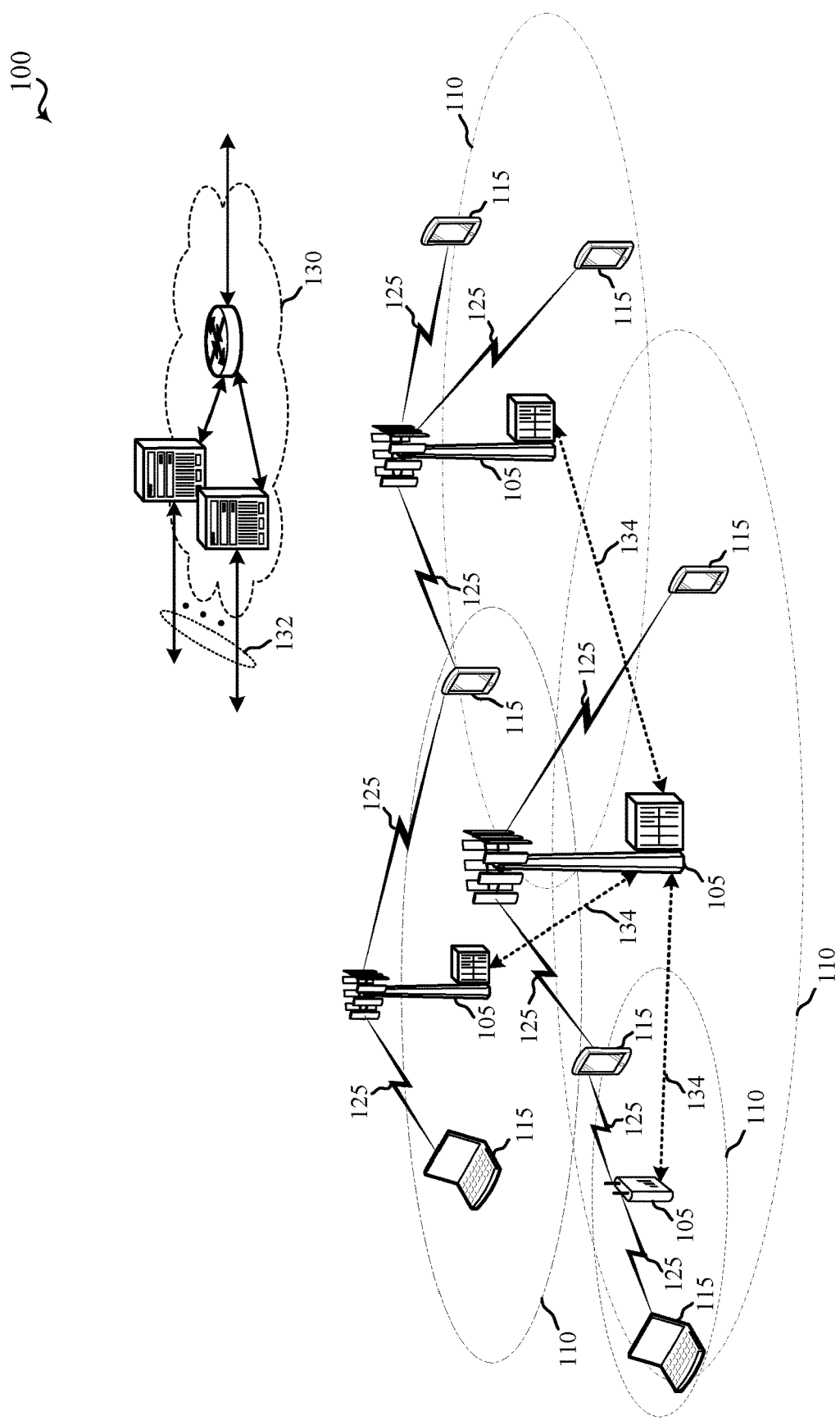
FIG. 1 illustrates an example of a wireless communication system in accordance with various aspects of the present disclosure.

The described features generally relate to a wireless communication system having a UE-centric MAC layer. A wireless communication system having a UE-centric MAC layer may be advantageous, in some respects, in a time-domain duplex (TDD) system having a large antenna array. The large antenna array may have limited coverage for broadcast channels (e.g., the channels that broadcast synchronization signals and system information in a wireless communication system having a network-centric MAC layer). As described in the present disclosure, a wireless communication system having a network-centric MAC layer may forego the broadcast of system information, as well as some cell-specific synchronization signals. A wireless communication system having a UE-centric MAC layer may also be advantageous, in some respects, in that mobility measurements can contribute to UE power consumption, and a wireless communication system having a UE-centric MAC layer can offload many mobility measurements previously performed by UEs to the network. A wireless communication system having a UE-centric MAC layer may also offload handover and cell reselection processing and decisions to the network side, which, when performed by a UE in a network-centric wireless communication system can be a major source of jitter and call drops. A wireless communication system having a UE-centric MAC layer may also be advantageous, in some respects, because the broadcast of system information and cell-specific information by a base station can contribute significantly to the power consumption of the base station. As previously indicated, a base station in a wireless communication system having a UE-centric MAC layer may often forego the broadcast of system information or cell-specific information.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WI-FI), IEEE 802.16 (WIMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB) may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The wireless communication links 125 shown in wireless communication system 100 may carry UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each wireless communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some embodiments of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some embodiments of the wireless communication system 100, the wireless communication system 100 may have a UE-centric MAC layer. On the network side, the base stations 105 may broadcast a synchronization signal. The UEs 115 may receive the synchronization signal, acquire a timing of the network from the synchronization signal, and in response to acquiring the timing of the network, transmit a pilot signal. The pilot signal transmitted by a UE 115 may be concurrently receivable by a plurality of cells (e.g., base stations) within the network. Each of the plurality of cells may measure a strength of the pilot signal, and the network (e.g., one or more of the base stations 105 and/or a central node within the core network 130) may determine a serving cell for the UE 115. As the UE 115 continues to transmit a pilot signal, the network may handover the UE 115 from one serving cell to another, with or without informing the UE 115. System information may be transmitted to UEs 115 on-demand (e.g., in response to a UE 115 transmits a pilot signal), thereby enabling the network to forego broadcasting the system information and enabling the network to conserve power.

Figure 2:
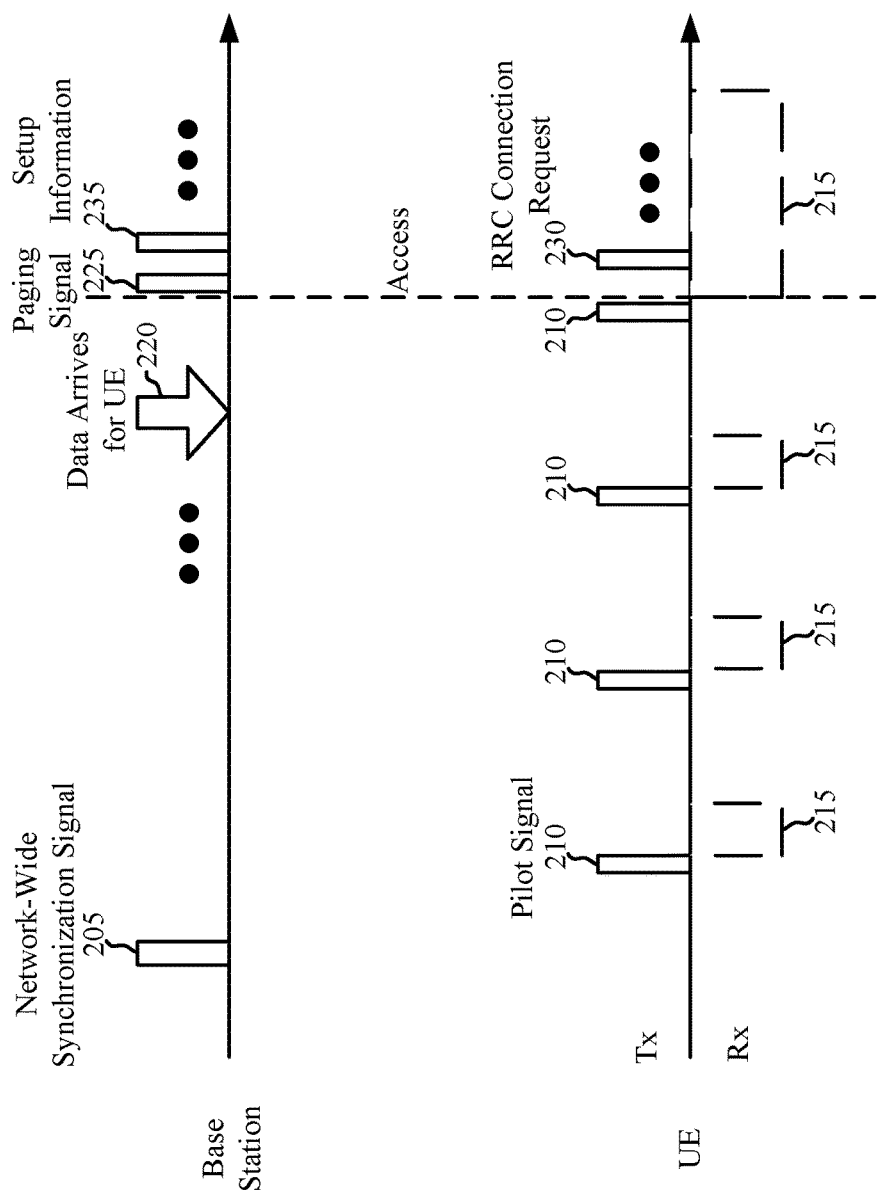
FIG. 2 shows an exemplary timeline of a UE-centric initial access to a network, in accordance with various aspects of the present disclosure.

FIG. 2 shows an exemplary timeline 200 of a UE-centric initial access to a network, in accordance with various aspects of the present disclosure. The initial access procedure may be performed by a UE in communication with a base station. In some examples, the UE may be one of the UEs 115 described with reference to FIG. 1, and the base station may be one of the base stations 105 described with reference to FIG. 1.

As shown in FIG. 2, a base station may broadcast a synchronization signal 205. The synchronization signal 205 may be common (e.g., non-cell-specific) to a plurality of cells within a network, and may be received from at least one of the plurality of cells (e.g., from at least one of a plurality of base stations in the cells) as a SFN broadcast. The synchronization signal need not include a cell identifier. In some examples, the synchronization signal 205 may be a periodic signal. In some embodiments, the synchronization signal 205 may have a relatively short duration or be transmitted relatively infrequently. For example, the synchronization signal 205 may have a duration of one symbol and be transmitted once every ten seconds. In other examples, the synchronization signal 205 may be transmitted more frequently, such as once per radio frame. In some embodiments, the synchronization signal 205 may carry a few bits of information, such as 4-6 bits of information. In some embodiments, the synchronization signal 205 may include system information request configuration information (e.g., system information block (SIB) request). The system information request configuration information may, in some examples, include at least one of an indication of a SIB request bandwidth, an indication of a SIB request timing (e.g., slot/symbol timing), a portion of a constellation identifier, or network access barring information (e.g., an indication of times when UEs of particular types may not transmit a SIB request). In some embodiments, the synchronization signal 205 may be more dynamic and be broadcast on a synchronization channel with guard.

A UE may receive the synchronization signal 205 and acquire a timing of the network based on the synchronization signal 205. In response to acquiring the timing of the network, the UE may transmit a pilot signal 210. The pilot signal 210 may be concurrently receivable by the plurality of cells within the network. In some embodiments, the pilot signal 210 may include a spatial signature (e.g., an SRS). The base station may in some cases have a large uplink spatial multiplexing capacity for receiving the SRS. In some embodiments, the pilot signal 210 may be transmitted in a SIB request occasion indicated by system information request configuration information received with the synchronization signal.

Following transmission of an instance of the pilot signal 210, the UE may listen for a transmission from the network (e.g., a transmission, from the base station, of on-demand system information for the UE or an uplink allocation for the UE). In some embodiments, the UE may listen for transmissions during a listening window 215. When the UE does not receive a transmission during the listening window 215, the UE may transition a receiver of the UE to a low power or OFF state until a next listening window 215, which may conserve power.

The base station may receive the pilot signal 210 and measure the pilot signal 210 for purposes of initial access to the network. Other base stations (or cells) may also receive and measure the pilot signal 210. A serving cell for the UE may be selected by one of the base stations, or by a central node in communication with the base stations, based at least in part on the measurements of the pilot signal 210. For example, each of a number of base stations may measure the power ($P_{PS}$) of the pilot signal (PS) 210, and a serving cell for the UE may be selected based on a function such as:

$$\text{serving cell} = \underset{i}{\text{argmax}} P_{PS_i}$$

where $P_{PS_i}$ is the measured power of a serving cell i, and where the serving cell selected for the UE is the serving cell that receives the pilot signal 210 at a greatest power. Serving cell selection is therefore handled (at least primarily) by the network, and the number of measurements performed by the UE, or processes managed by the UE, may be reduced.

When the base station has information to transmit to the UE, indicated by data arrival 220, the base station may transmit a unicast paging signal 225 to the UE. In some embodiments, the unicast paging signal 225 may be transmitted with on-demand system information for the UE (e.g., an on-demand SIB or MIB). In some examples, the base station may initiate communication with a plurality of UEs using a multicast paging signal. Following receipt of a paging signal (e.g., the unicast paging signal 225), the UE may increase the duration of its current listening window 215, and in some cases transmit a radio resource control (RRC) connection request 230 to the base station (e.g., an LTE/LTE-A random access channel (RACH) message 3 (MSG3)). In some cases, the base station may transmit additional connection setup information 235 to the UE, or perform additional contention resolution procedures, following receipt of the RRC connection request 230.

When the UE has information to transmit to the base station, the UE may transmit a scheduling request (SR) with one or more instances of the pilot signal 210. In response to receiving the pilot signal 210 or the scheduling request, the base station may transmit on-demand system information (e.g., an on-demand system information block (SIB) or master information block (MIB)) to the UE. The base station may also transmit an uplink allocation (e.g., an uplink grant) to the UE. In some embodiments, the system information and uplink allocation may be transmitted to the UE in a same downlink transmission. In some cases, the uplink allocation may be spatially multiplexed. Following receipt of an uplink allocation, the UE may increase the duration of its current listening window 215, and in some cases may transmit an RRC connection request 230 to the base station (e.g., an LTE/LTE-A RACH MSG3). In some cases, the base station may transmit additional connection setup information 235 to the UE, or perform additional contention resolution procedures, following receipt of the RRC connection request 230.

When system information is transmitted from the base station to a number of UEs on-demand (e.g., when needed for an uplink or downlink transmission between the base station and one or more of the UEs), the base station may reduce or eliminate periodic broadcasts of system information, which may conserve power. On the UE side, a UE may conserve power by not listening for system information broadcasts, and instead only listening for on-demand system information transmissions.

In some embodiments of the timeline 200 shown in FIG. 2, different synchronization signals may be transmitted for different constellations (e.g., different groups of cells, nodes, or base stations of the network, or different groups of cells, nodes, or base stations belonging to different networks).

Figure 3:
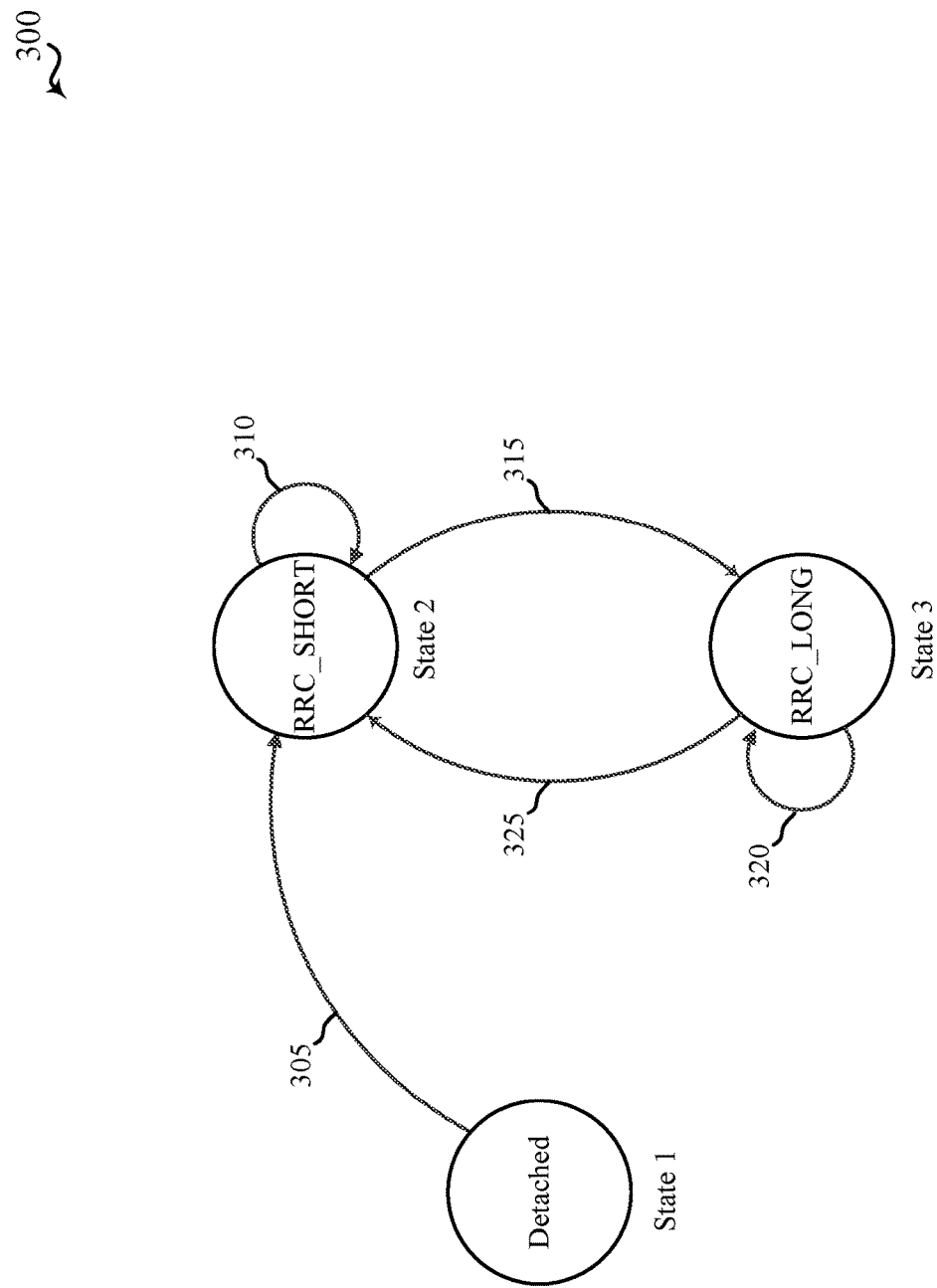
FIG. 3 shows an exemplary RRC state diagram for a UE, in accordance with various aspects of the present disclosure.

FIG. 3 shows an exemplary RRC state diagram 300 for a UE, in accordance with various aspects of the present disclosure. In some examples, the UE may be one of the UEs 115 described with reference to FIG. 1.

As shown in FIG. 3, State 1 may be a state in which a UE is detached from a network. When in State 1, the UE may perform a procedure to access the network (e.g., an initial access or reconnection procedure). Upon accessing the network (indicated by transition 305), the UE may enter State 2. Upon entering State 2, the network may allocate an "active set"/"paging area" to monitor mobility of the UE. The network may also monitor traffic of the UE. Upon the UE entering State 2, the network may maintain an activate context for the UE until the UE leaves the network.

State 2 may be an RRC connected state. Upon entering State 2, the UE may remain in an RRC connected state (e.g., not enter an idle state) until leaving the network. As shown, State 2 may be an RRC_SHORT state. The RRC_SHORT state may be associated with a first DRX cycle (e.g., a short DRX cycle). When operating in the RRC_SHORT state, the network may allocate a downlink (DL) channel state information reference signal (CSI-RS), such as a beamformed CSI-RS for channel quality indication (CQI) reporting. The network may also allocate uplink (UL) resources for control channels. Also when operating in the RRC_SHORT state, the UE may transmit, according to the first DRX cycle, at least one of: an SR, a buffer status report (BSR), a connected state pilot signal (e.g., an SRS), or an indicator of a channel quality based on a reference signal (e.g., a beamformed CSI-RS) configured for and received by the UE. The connected state pilot signal may be transmitted using resources (e.g., time and frequency resources) identified by the network for the UE, and may include an identifier of the UE. The UE may also monitor a grant channel (e.g., a physical downlink control channel (PDCCH)) for an identifier of the UE (e.g., a cell radio network temporary identifier (C-RNTI)). The grant channel may carry, for example, paging signals or uplink grants for the UE.

When operating in the RRC_SHORT state, the UE may determine a traffic level (a level of uplink and/or downlink traffic between the UE and the network). In some embodiments, the traffic level may be determined based on at least one of: a network-transmitted traffic level indicator; a network command; a status of a timer maintained at the UE; or a buffer status of the UE. When it is determined that the traffic level satisfies a threshold (e.g., when the traffic level is high enough), the UE may remain in the RRC_SHORT state, as indicated by transition 310. When it is determined that the traffic level does not satisfy a threshold, the UE may transition to State 3 (indicated by 315).

State 3 may be another RRC connected state. As shown, State 3 may be an RRC_LONG state. The RRC_LONG state may be associated with a second DRX cycle (e.g., a long DRX cycle, which may be longer than the short DRX cycle of the RRC_SHORT state). When operating in the RRC_LONG state, the network may allocate uplink (UL) resources for the transmission of a connected state pilot signal (e.g., an SRS). Also when operating in the RRC_LONG state, the UE may transmit the pilot signal according to the second DRX cycle. The UE may also monitor a grant channel (e.g., the PDCCH) for an identifier of the UE (e.g., a C-RNTI). The RRC_LONG state may enable the UE to conserve power by enabling the UE to sleep between periodic wake ups (indicated by 320) for monitoring and signal transmission.

In some embodiments, the traffic level may be compared to a first threshold when determining whether to switch from the RRC_SHORT state to the RRC_LONG state (indicated by 315), and the traffic level may be compared to a second threshold when determining whether to switch from the RRC_LONG state to the RRC_SHORT state (indicated by 325).

Figure 4:
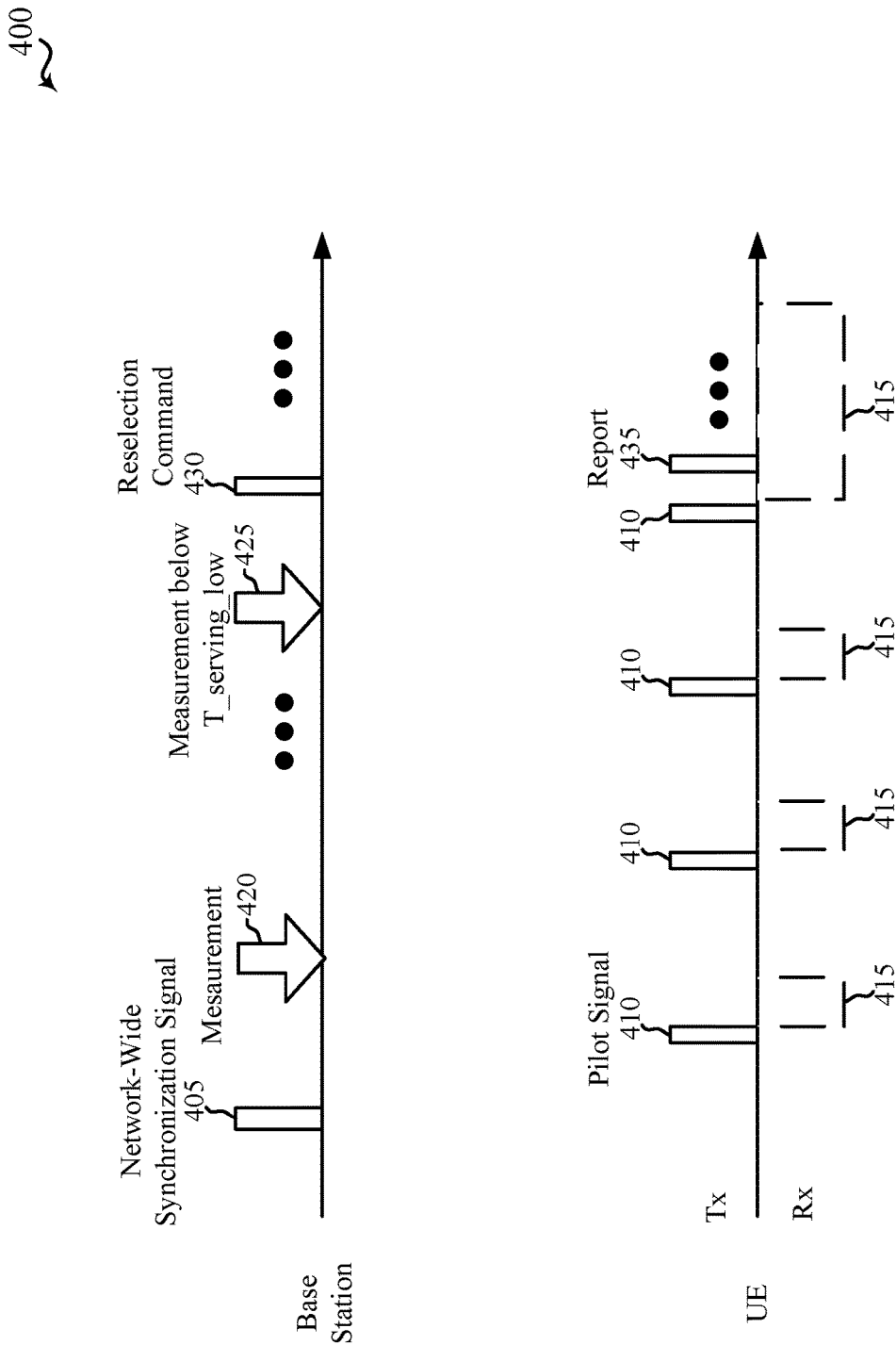
FIG. 4 shows an exemplary timeline for network-managed mobility, frequency reselection, and constellation reselection, in accordance with various aspects of the present disclosure.

FIG. 4 shows an exemplary timeline 400 for network-managed mobility and constellation reselection, in accordance with various aspects of the present disclosure. The timeline 400 shows communications between a UE and a base station. In some examples, the UE may be one of the UEs 115 described with reference to FIG. 1, and the base station may be one of the base stations 105 described with reference to FIG. 1.

As shown in FIG. 4, a base station may broadcast a synchronization signal 405. A UE may receive the synchronization signal 405, acquire a timing of the network based on the synchronization signal 405, and in response to acquiring the timing of the network, transmit a pilot signal 410. The pilot signal 410 may identify the UE and be concurrently receivable by the plurality of cells within the network. In some embodiments, the pilot signal 410 may include a spatial signature (e.g., an SRS). Following transmission of an instance of the pilot signal 410, the UE may listen for a transmission from the network (e.g., a transmission of a paging signal or uplink allocation from the base station, which transmission may include on-demand system information) during a listening window 415. When the UE does not receive a transmission during the listening window 415, the UE may transition a receiver to a low power or OFF state until a next listening window 415, which may conserve power. Further exemplary details concerning the synchronization signal 405, the pilot signal 410, or the listening window 415 are described with reference to FIG. 2 and the synchronization signal 205, the pilot signal 210, or the listening window 215.

The base station may also measure the pilot signal 410 for purposes of initial access to the network, or for mobility management or constellation reselection within the network. Other base stations (or cells) may also receive and measure the pilot signal 410 and obtain the identity of the UE. In some cases, each of a number of base stations may measure the power ($P_{PS}$) of the pilot signal (PS) 410 at a measurement time 420, and a serving cell (e.g., a handover target) for the UE may be selected based on a function such as:

$$\text{serving cell} = \underset{i}{\arg\max} P_{PS_i}$$

where $P_{PS_i}$ is the measured power of a serving cell i, and where the serving cell selected for the UE is the serving cell that receives the pilot signal 410 at a greatest power. A handover target may be selected after receipt of each instance of the pilot signal 410, or less frequently. A handover target may also be selected when a measurement 425 of the power of the pilot signal 410 by the current serving cell falls below a threshold (e.g., T_serving_low). A change in serving cell for the UE may be transparent to the UE.

In some embodiments, the base station may receive measurements of the power of the pilot signal 410 from other base stations and determine whether it is the serving cell for the UE. In some embodiments, the base station may transmit a measurement of the power of the pilot signal 410 to a central node, and receive (or not receive) an indication that the base station is a serving cell for the UE. Serving cell selection and mobility management is therefore handled (at least primarily) by the network, and the number of measurements performed by the UE, or processes managed by the UE, may be reduced.

Under some scenarios, a base station or central node may not identify a handover target for the UE, but may determine that a frequency reselection or constellation reselection is warranted (e.g., because the UE is moving out of coverage). Under such scenarios, the base station operating as the current serving cell may transmit a reselection command 430 to the UE, and the UE may perform a frequency reselection or constellation reselection (e.g., as indicated by the reselection command 430, or as determined by the UE). The UE may then report a result 435 of its frequency reselection or constellation reselection to the base station.

Figure 5:
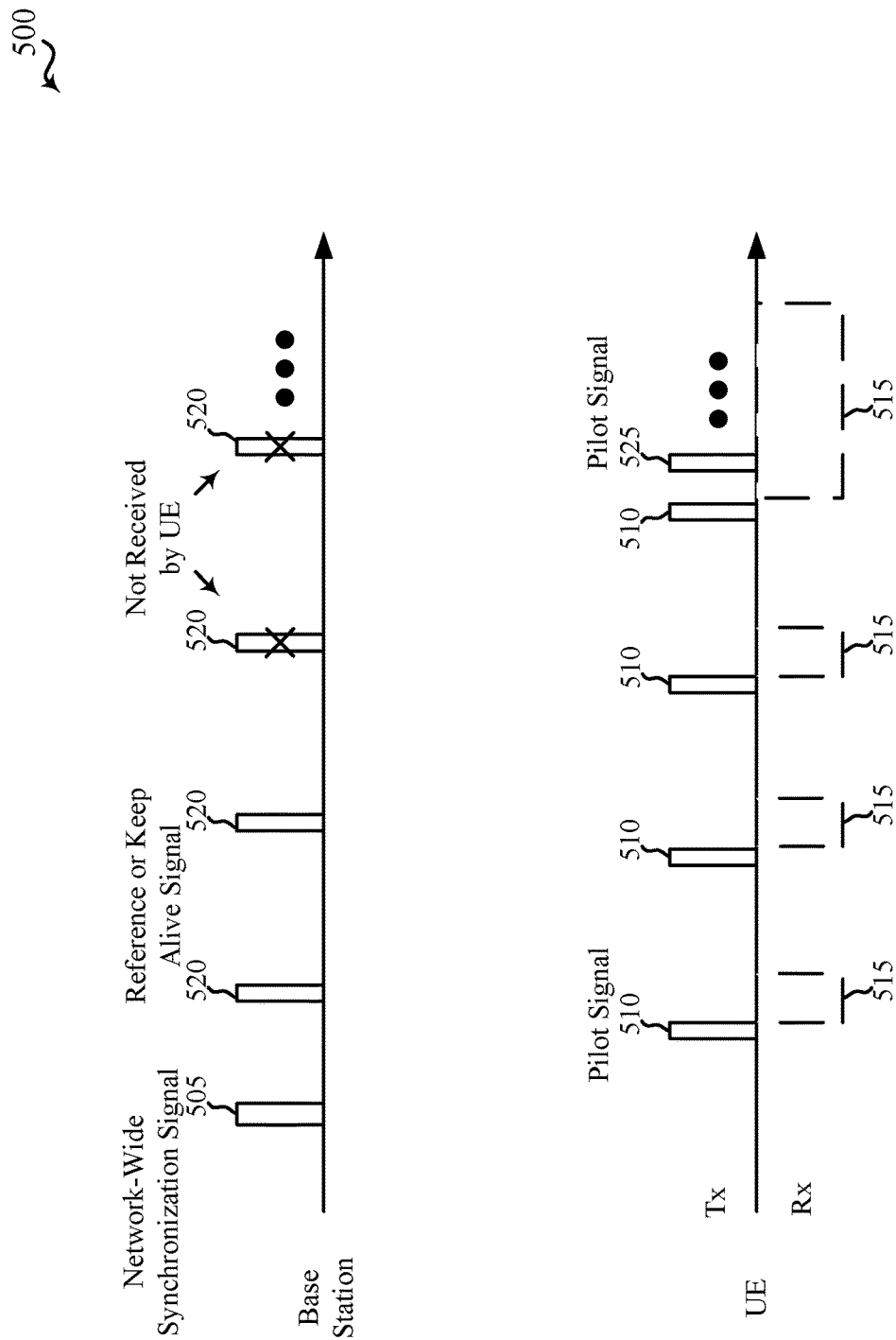
FIG. 5 shows an exemplary timeline for UE-managed frequency reselection or constellation reselection in the event of radio link failure, in accordance with various aspects of the present disclosure.

FIG. 5 shows an exemplary timeline 500 for UE-managed frequency reselection or constellation reselection in the event of radio link failure, in accordance with various aspects of the present disclosure. The timeline 500 shows communications between a UE and a base station. In some examples, the UE may be one of the UEs 115 described with reference to FIG. 1, and the base station may be one of the base stations 105 described with reference to FIG. 1.

As shown in FIG. 5, a base station may broadcast a synchronization signal 505. A UE may receive the synchronization signal 505, acquire a timing of the network based on the synchronization signal 505, and in response to acquiring the timing of the network, transmit a pilot signal 510. The pilot signal 510 may identify the UE and be concurrently receivable by the plurality of cells within the network. In some embodiments, the pilot signal 510 may include a spatial signature (e.g., an SRS). Following transmission of an instance of the pilot signal 510, the UE may listen for a transmission from the network (e.g., a transmission of a paging signal or uplink allocation from the base station, which transmission may include on-demand system information) during a listening window 515. When the UE does not receive a transmission during the listening window 515, the UE may transition a receiver to a low power or OFF state until a next listening window 515, which may conserve power. Further exemplary details concerning the synchronization signal 505, the pilot signal 510, or the listening window 515 are described with reference to FIG. 2 and the synchronization signal 205, the pilot signal 210, or the listening window 215.

Under some scenarios, such as, when the UE is operating in the RRC_LONG state described with reference to FIG. 3, the UE may measure a strength of a signal 520 (e.g., a reference signal, such as a CSI-RS or beamformed CSI-RS) received from the base station to predict control error. The UE may receive the signal 520 during one or more of the listening windows 515. When the strength of the signal indicates a low signal-to-noise ratio (SNR), the UE may perform a constellation reselection based at least in part on the measurement of the signal 520, and upon successfully performing the constellation reselection, transmit a pilot signal 525 to the new constellation.

Under other scenarios, such as, when the UE is operating in the RRC_LONG state described with reference to FIG. 3, the UE may receive, or receive and measure a strength of, a signal 520 (e.g., a keep alive signal) received from the base station. The UE may receive the signal 520 during one or more of the listening windows 515. However, in the case of radio link failure (RLF), the UE may not receive one or more instances of the signal 520. Or, the UE may determine that the strength of the signal indicates a low SNR. In such cases, the UE may perform a constellation reselection based at least in part on the signal 520 (e.g., based at least in part on non-receipt of or measurement of the signal 520). Upon successfully performing the constellation reselection, the UE may transmit a pilot signal 525 to the new constellation.

In some configurations, a keep alive signal may be transmitted on resources (e.g., time and frequency resources) allocated to a particular UE. In some configurations, a keep alive signal may carry power control information or timing advance information. In some embodiments, a keep alive signal may be transmitted according to a duty cycle based on UE channel condition. In some embodiments, a UE may be compute a reference signal received power (RSRP) and determine whether to perform a frequency reselection or constellation reselection based at least in part on the RSRP.

Figure 6:
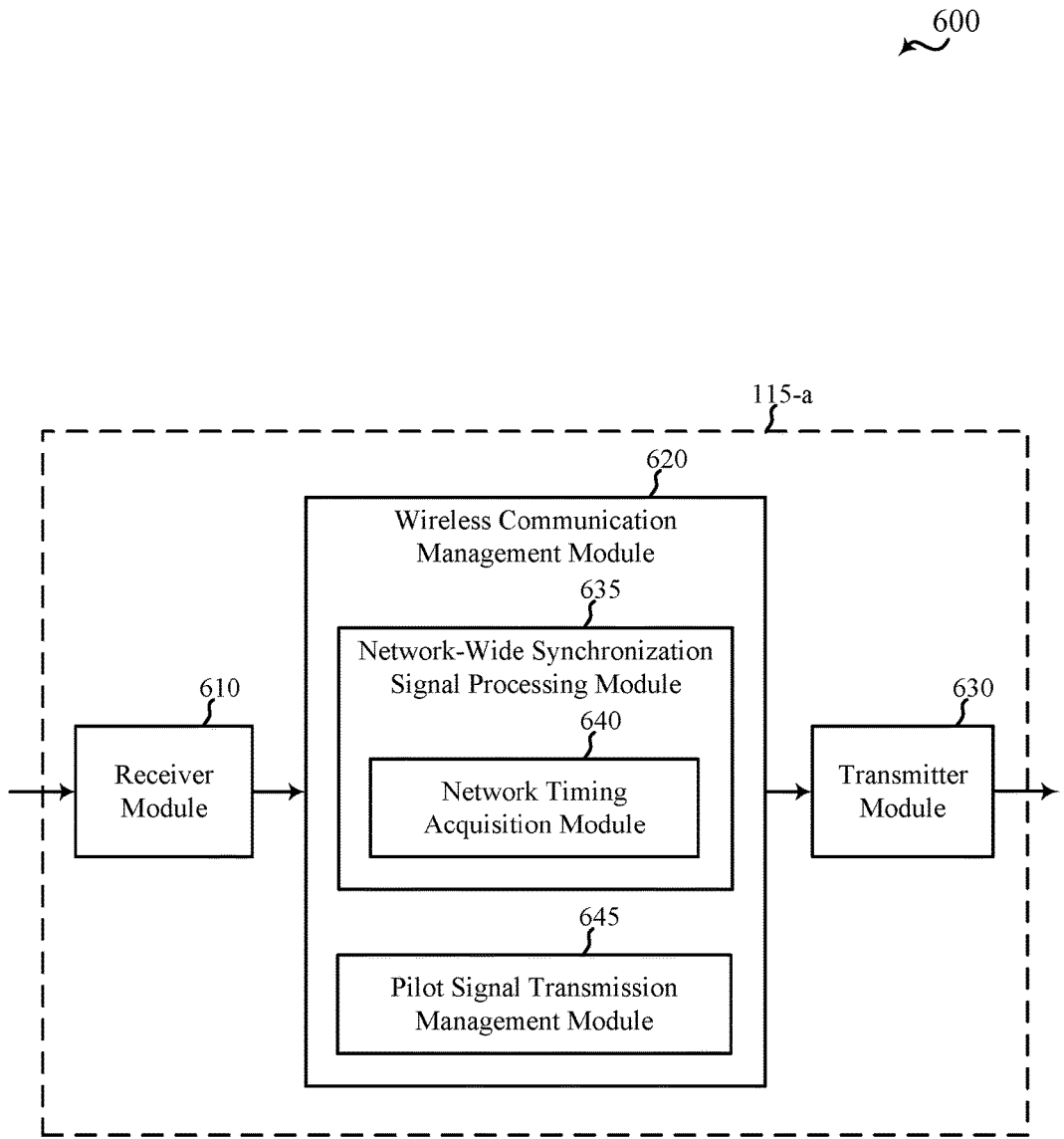
FIG. 6 shows a block diagram of a UE for use in wireless communication, in accordance with various aspects of the present disclosure.

FIG. 6 shows a block diagram 600 of a UE 115-*a* for use in wireless communication, in accordance with various aspects of the present disclosure. The UE 115-*a* may be an example of aspects of one or more of the UEs 115 described with reference to FIG. 1. The UE 115-*a* may also be or include a processor (e.g., an ASIC (as discussed below) or special purpose processor configured to control one or more functions of the UE 115). The UE 115-*a* may include a receiver module 610, a wireless communication management module 620, or a transmitter module 630. Each of these modules may be in communication with each other.

The modules of the UE 115-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 610 may include at least one radio frequency (RF) receiver. The receiver module 610 or RF receiver may be used to receive various types of data or control signals (i.e., transmissions) over one or more communication links of a wireless communication system, such as one or more communication links of the wireless communication system 100 described with reference to FIG. 1.

In some examples, the transmitter module 630 may include at least one RF transmitter. The transmitter module 630 or RF transmitter may be used to transmit various types of data or control signals (i.e., transmissions) over one or more communication links of a wireless communication system, such as one or more communication links of the wireless communication system 100 described with reference to FIG. 1.

The wireless communication management module 620 may be used to manage one or more aspects of wireless communication for the UE 115-*a*. In some examples, the wireless communication management module 620 may include a synchronization signal processing module 635 or a pilot signal transmission management module 645.

The synchronization signal processing module 635 may be used to receive a synchronization signal. The synchronization signal may be common (e.g., non-cell specific) to a plurality of cells within a network, and may be received from at least one of the plurality of cells (e.g., from at least one of a plurality of base stations in the cells) as a SFN broadcast. The synchronization signal need not include a cell identifier. In some examples, the synchronization signal may be a periodic signal. In some embodiments, the synchronization signal may include system information request (e.g., SIB request) configuration information. The configuration information may, in some examples, include at least one of an indication of a SIB request bandwidth, an indication of a SIB request timing (e.g., slot/symbol timing), a portion of a constellation identifier, or network access barring information (e.g., an indication of times when UEs of particular types may not transmit a SIB request).

The synchronization signal processing module 635 may include a network timing acquisition module 640. The network timing acquisition module 640 may be used to acquire a timing of the network based on the synchronization signal.

The pilot signal transmission management module 645 may be used to transmit a pilot signal in response to acquiring the timing of the network. The pilot signal may be concurrently receivable by the plurality of cells within the network. In some embodiments, the pilot signal may include a spatial signature (e.g., an SRS). In some embodiments, the pilot signal may be transmitted in a SIB request occasion indicated by system information request configuration information received with the synchronization signal, and may be transmitted with a random sequence usable by a base station to temporarily identify the UE during initial acquisition.

Figure 7:
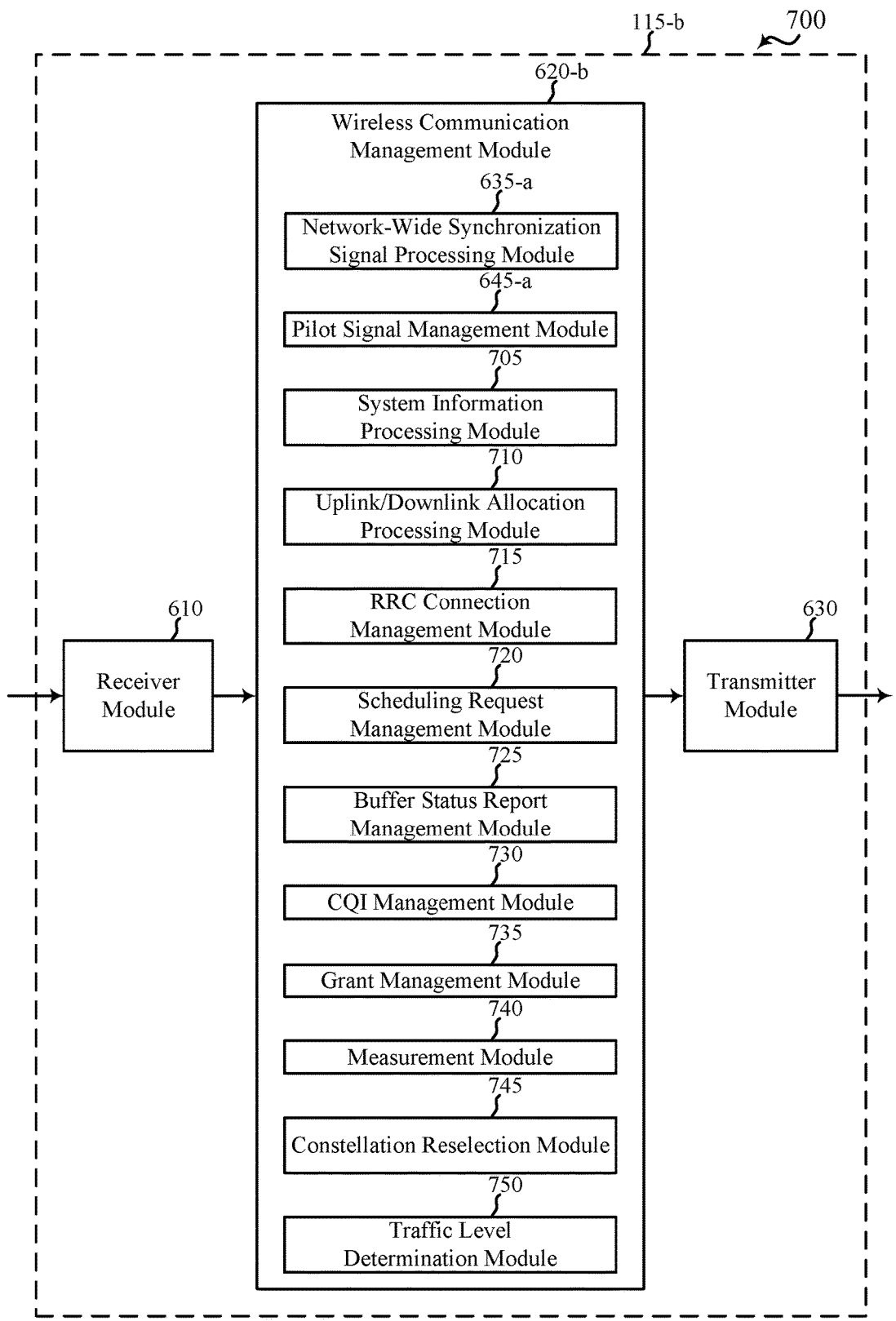
FIG. 7 shows a block diagram of a UE for use in wireless communication, in accordance with various aspects of the present disclosure.

FIG. 7 shows a block diagram 700 of a UE 115-*b* for use in wireless communication, in accordance with various aspects of the present disclosure. The UE 115-*b* may be an example of aspects of one or more of the UEs 115 described with reference to FIG. 1 or 6. The UE 115-*b* may also be or include a processor. The UE 115-*b* may include a receiver module 610, a wireless communication management module 620-*a*, or a transmitter module 630. Each of these modules may be in communication with each other.

The modules of the UE 115-*b* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some embodiments, the receiver module 610 or transmitter module 630 may be configured as described with reference to FIG. 6.

The wireless communication management module 620-*a* may be used to manage one or more aspects of wireless communication for the UE 115-*b*. In some examples, the wireless communication management module 620-*a* may include a synchronization signal processing module 635-*a*, a pilot signal transmission management module 645-*a*, a system information processing module 705, an uplink/downlink allocation processing module 710, an RRC connection management module 715, a scheduling request management module 720, a buffer status report management module 725, a CQI management module 730, a grant management module 735, a measurement module 740, a constellation reselection module 745, or a traffic level determination module 750.

The synchronization signal processing module 635-*a* may be used to receive a synchronization signal. The synchronization signal may be common (e.g., non-cell specific) to a plurality of cells within a network, and may be received from at least one of the plurality of cells (e.g., from at least one of a plurality of base stations in the cells) as a SFN broadcast. The synchronization signal need not include a cell identifier. In some examples, the synchronization signal may be a periodic signal. In some embodiments, the synchronization signal may include system information request (e.g., SIB request) configuration information. The configuration information may, in some examples, include at least one of an indication of a SIB request bandwidth, an indication of a SIB request timing (e.g., slot/symbol timing), a portion of a constellation identifier, or network access barring information (e.g., an indication of times when UEs of particular types may not transmit a SIB request).

The synchronization signal processing module 635-*a* may include a network timing acquisition module (not shown), which may be used to acquire a timing of the network based on the synchronization signal.

The pilot signal transmission management module 645-*a* may be used to transmit a pilot signal in response to acquiring the timing of the network. The pilot signal may be concurrently receivable by the plurality of cells within the network. In some embodiments, the pilot signal may include a spatial signature (e.g., an SRS). In some embodiments, the pilot signal may be transmitted in a SIB request occasion indicated by system information request configuration information received with the synchronization signal, and may be transmitted with a random sequence usable by a base station to temporarily identify the UE during initial acquisition.

The system information processing module 705 may be used to receive, in response to transmitting the pilot signal, on-demand system information for the UE. The on-demand system information for the UE may include the random sequence transmitted with the pilot signal, and in some embodiments may include an identifier of the UE.

The uplink/downlink allocation processing module 710 may be used to receive, in response to transmitting the pilot signal, an uplink allocation for the UE. The uplink/downlink allocation processing module 710 may also be used to receiving a paging signal. By way of example, the paging signal may include a unicast paging signal or a multicast paging signal.

The RRC connection management module 715 may be used to transmit an RRC connection request to the network in response to receiving at least one of on-demand system information for the UE or an uplink allocation for the UE. In some embodiments, the network may allocate an active set of resource or paging area for the UE upon the UE connecting to the network, and may maintain an active context for the UE, in the network, until the UE leaves the network. In some embodiments, the UE 115-*b* may enter a first RRC connected state upon initial access, and then switch between a plurality of RRC connected states (e.g., the first RRC connected state and a second RRC connected state) based at least in part on a traffic level determined by the traffic level determination module 750. The first RRC connected state may be associated with a first DRX cycle, and the second RRC connected state may be associated with a second DRX cycle. The second DRX cycle may differ from the first DRX cycle, and in some embodiments, the second DRX cycle may be longer than the first DRX cycle.

When operating in the first RRC connected state, and according to the first DRX cycle, the scheduling request management module 720 may transmit an SR, the buffer status report management module 725 may transmit a BSR, the pilot signal transmission management module 645-*a* may transmit a connected state pilot signal (e.g., an SRS), or the CQI management module 730 may transmit an indicator of a channel quality based on a reference signal configured for and received by the UE 115-*b*. The connected state pilot signal may be transmitted using resources (e.g., time and frequency resources) identified by the network for the UE, and may include an identifier of the UE.

Also when operating in the first RRC connected state, the uplink/downlink allocation processing module 710 may monitor a grant channel for an identifier of the UE. The grant channel may carry, for example, paging signals or uplink grants for the UE 115-*b*.

Still further when operating in the first RRC connected state, the measurement module 740 may measure a reference signal. In some embodiments, the reference signal may include a reference signal configured for and received by the UE 115-*b* (e.g., the reference signal on which the indicator of channel quality is based). In some embodiments, the reference signal may include a CSI-RS or beamformed CSI-RS received from the network. The constellation reselection module 745 may be used to determine, based at least in part on a measurement of the keep alive signal or a decoding error of the keep alive signal performed by the measurement module 740, whether to perform a constellation reselection. When the constellation reselection module 745 determines to perform a constellation reselection, the constellation reselection module 745 may perform the constellation reselection, and upon selecting the new constellation, the pilot signal transmission management module 645-*a* may transmit a pilot signal in response to a second synchronization signal received from the new constellation.

When operating in the second RRC connected state, the pilot signal transmission management module 645-*a* may be used to transmit a connected state pilot signal (e.g., an SRS) according to the second DRX cycle. The connected state pilot signal may be transmitted using resources (e.g., time and frequency resources) identified by the network for the UE, and may include an identifier of the UE. Also when operating in the second RRC connected state, the UE may monitor a grant channel for an identifier of the UE. The grant channel may carry, for example, a paging signal for the UE. Still further, and when operating in the second RRC connected state, the UE may periodically measure a keep alive signal received from the network.

Also when operating in the second RRC connected state, the constellation reselection module 745 may be used to determine, based at least in part on a keep alive signal, whether to perform a constellation reselection. When the constellation reselection module 745 determines to perform a constellation reselection, the constellation reselection module 745 may perform the constellation reselection and, upon selecting the new constellation, the pilot signal transmission management module 645-a may transmit a pilot signal in response to a second synchronization signal received from the new constellation.

In some embodiments, the constellation reselection module 745 may be used to receive a reselection command from the network, and may select, in response to the reselection command, a new constellation.

The traffic level determination module 750 may be used to determine a traffic level (e.g., an uplink and/or downlink traffic level) for the UE 115-b. In some embodiments, the traffic level may be determined based on at least one of: a network-transmitted traffic level indicator; a network command; a status of a timer maintained at the UE; or a buffer status of the UE. The traffic level determination module 750 may also determine whether the traffic level satisfies a threshold. When the traffic level satisfies the threshold, the RRC connection management module 715 may switch the UE 115-b to (or maintain the UE 115-b in) the first RRC connected state. When the traffic level does not satisfy the threshold, the RRC connection management module 715 may switch the UE 115-b to (or maintain the UE 115-b in) the second RRC connected state. In some embodiments, the traffic level may be compared to a first threshold when determining whether to switch from the first RRC connected state to the second RRC connected state, and the traffic level may be compared to a second threshold when determining whether to switch from the second RRC connected state to the first RRC connected state.

Figure 8:
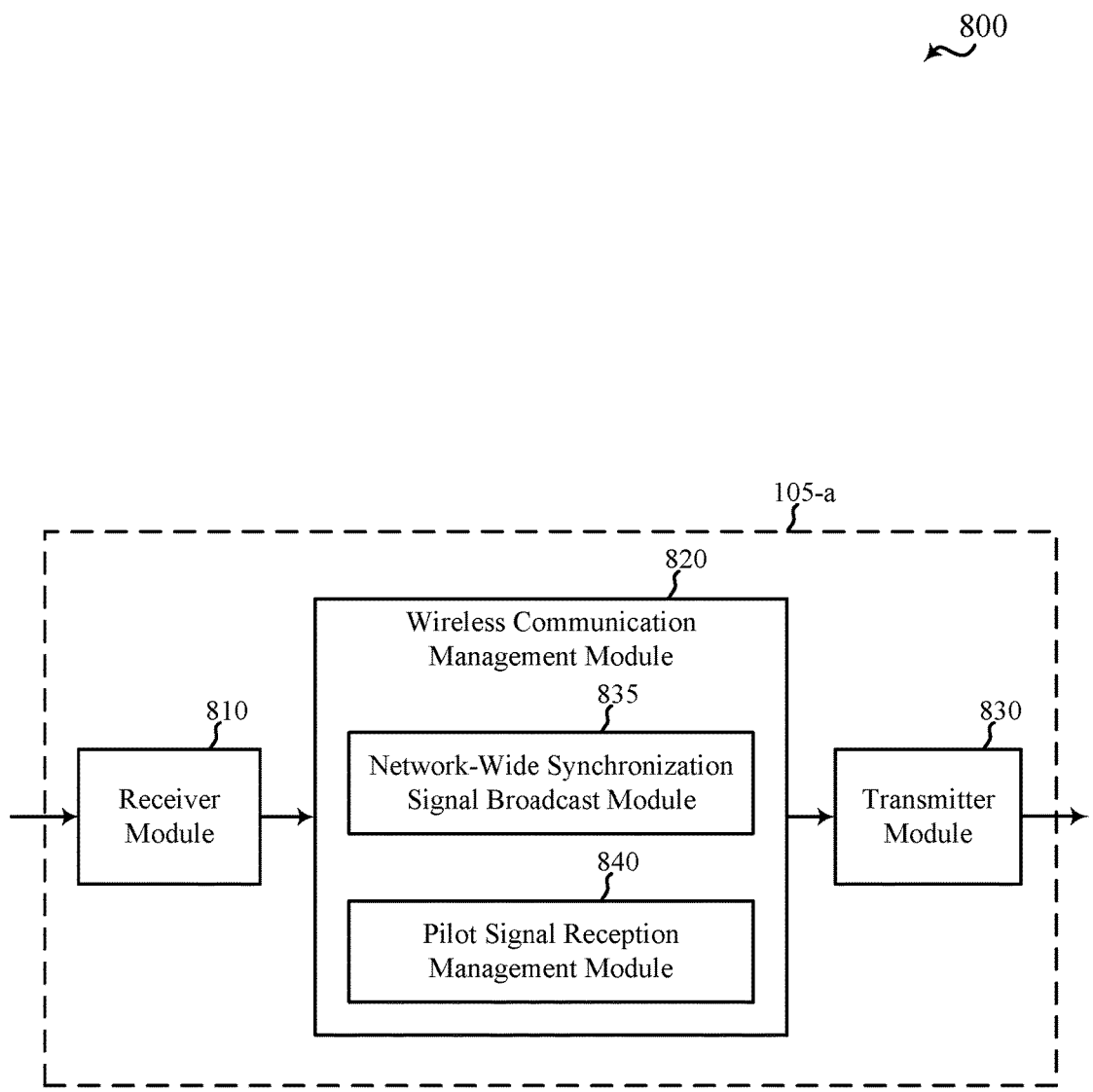
FIG. 8 shows a block diagram of a base station for use in wireless communication, in accordance with various aspects of the present disclosure.

FIG. 8 shows a block diagram 800 of a base station 105-a for use in wireless communication, in accordance with various aspects of the present disclosure. The base station 105-a may be an example of aspects of one or more of the base stations 105 described with reference to FIG. 1. The base station 105-a may also be or include a processor. The base station 105-a may include a receiver module 810, a wireless communication management module 820, and a transmitter module 830. Each of these modules may be in communication with each other.

The modules of the base station 105-a may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 810 may include at least one RF receiver or at least one backhaul receiver. The backhaul receiver may be used for communicating with other base stations or a central node (e.g., a node of a core network such as the core network 130 described with reference to FIG. 1). The receiver module 810, RF receiver, or backhaul receiver may be used to receive various types of data or control signals (i.e., transmissions) over one or more communication links of a wireless communication system, such as one or more communication links or backhaul links of the wireless communication system 100 described with reference to FIG. 1.

In some examples, the transmitter module 830 may include at least one RF transmitter or at least one backhaul transmitter. The transmitter module 830, RF transmitter, or backhaul transmitter may be used to transmit various types of data or control signals (i.e., transmissions) over one or more communication links of a wireless communication system, such as one or more communication links or backhaul links of the wireless communication system 100 described with reference to FIG. 1.

The wireless communication management module 820 may be used to manage one or more aspects of wireless communication for the base station 105-a. In some examples, the wireless communication management module 820 may include a synchronization signal broadcast module 835 or a pilot signal reception management module 840.

The synchronization signal broadcast module 835 may be used to broadcast a synchronization signal. The synchronization signal may be common (e.g., non-cell specific) to a plurality of cells within a network, and may be received from at least one of the plurality of cells (e.g., from at least one of a plurality of base stations in the cells) as a SFN broadcast. The synchronization signal need not include a cell identifier. In some examples, the synchronization signal may be a periodic signal. In some embodiments, the synchronization signal may include system information request (e.g., SIB request) configuration information. The configuration information may, in some examples, include at least one of an indication of a SIB request bandwidth, an indication of a SIB request timing (e.g., slot/symbol timing), a portion of a constellation identifier, or network access barring information (e.g., an indication of times when UEs of particular types may not transmit a SIB request).

The pilot signal reception management module 840 may be used to receive a number of pilot signals from a first number of UEs. Each of the number of pilot signals may identify a UE in the first number of UEs and be concurrently receivable by the plurality of cells within the network.

Figure 9:
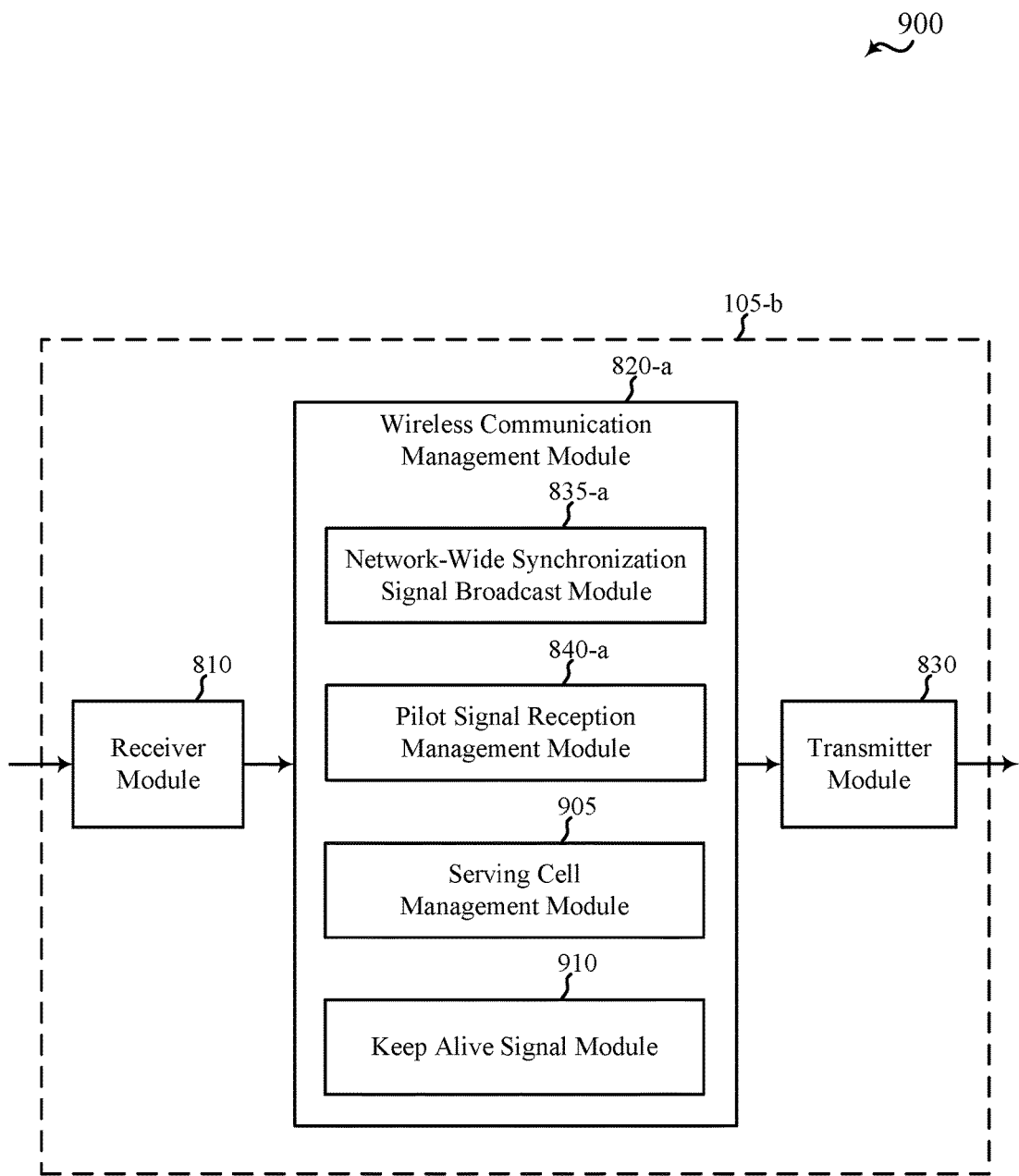
FIG. 9 shows a block diagram of a base station for use in wireless communication, in accordance with various aspects of the present disclosure.

FIG. 9 shows a block diagram 900 of a base station 105-b for use in wireless communication, in accordance with various aspects of the present disclosure. The base station 105-b may be an example of aspects of one or more of the base stations 105 described with reference to FIG. 1 or 8. The base station 105-b may also be or include a processor. The base station 105-b may include a receiver module 810, a wireless communication management module 820-a, or a transmitter module 830. Each of these modules may be in communication with each other.

The modules of the base station 105-b may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some embodiments, the receiver module 810 or transmitter module 830 may be configured as described with reference to FIG. 8.

The wireless communication management module 820-*a* may be used to manage one or more aspects of wireless communication for the base station 105-*b*. In some examples, the wireless communication management module 820-*a* may include a synchronization signal broadcast module 835-*a*, a pilot signal reception management module 845-*a*, or a serving cell management module 905.

The synchronization signal broadcast module 835-*a* may be used to broadcast a synchronization signal. The synchronization signal may be common (e.g., non-cell specific) to a plurality of cells within a network, and may be received from at least one of the plurality of cells (e.g., from at least one of a plurality of base stations in the cells) as a SFN broadcast. The synchronization signal need not include a cell identifier. In some examples, the synchronization signal may be a periodic signal. In some embodiments, the synchronization signal may include system information request (e.g., SIB request) configuration information. The configuration information may, in some examples, include at least one of an indication of a SIB request bandwidth, an indication of a SIB request timing (e.g., slot/symbol timing), a portion of a constellation identifier, or network access barring information (e.g., an indication of times when UEs of particular types may not transmit a SIB request).

The pilot signal reception management module 840-*a* may be used to receive a number of pilot signals from a first number of UEs. Each of the number of pilot signals may identify a UE in the first number of UEs and be concurrently receivable by the plurality of cells within the network.

The serving cell management module 905 may be used to identify, from the first number of UEs, a second number of UEs for which the base station 105-*b* will serve as a serving cell. In some embodiments, the second number of UEs may be identified locally at the base station 105-*b*, or in a distributed manner by the plurality of cells. In some embodiments, the second number of UEs may be identified by transmitting information corresponding to the number of pilot signals to a central node, and receiving an indication of the second number of UEs from the central node.

The keep alive signal module 910 may be used when one or more of the second number of UEs is operating in the second RRC connected state described with reference to FIG. 7, to transmit a keep alive signal to the one or more of the second number of UEs. In some examples, different keep alive signals may be transmitted to different UEs.

In some embodiments of the method 2000 (discussed in more detail below), the base station may allocate an active set of resources or paging area to monitor the UE's mobility or traffic, and may alone, or in combination with other base stations or a central node, maintain an active context for the UE until the UE leaves the network.

Figure 10:
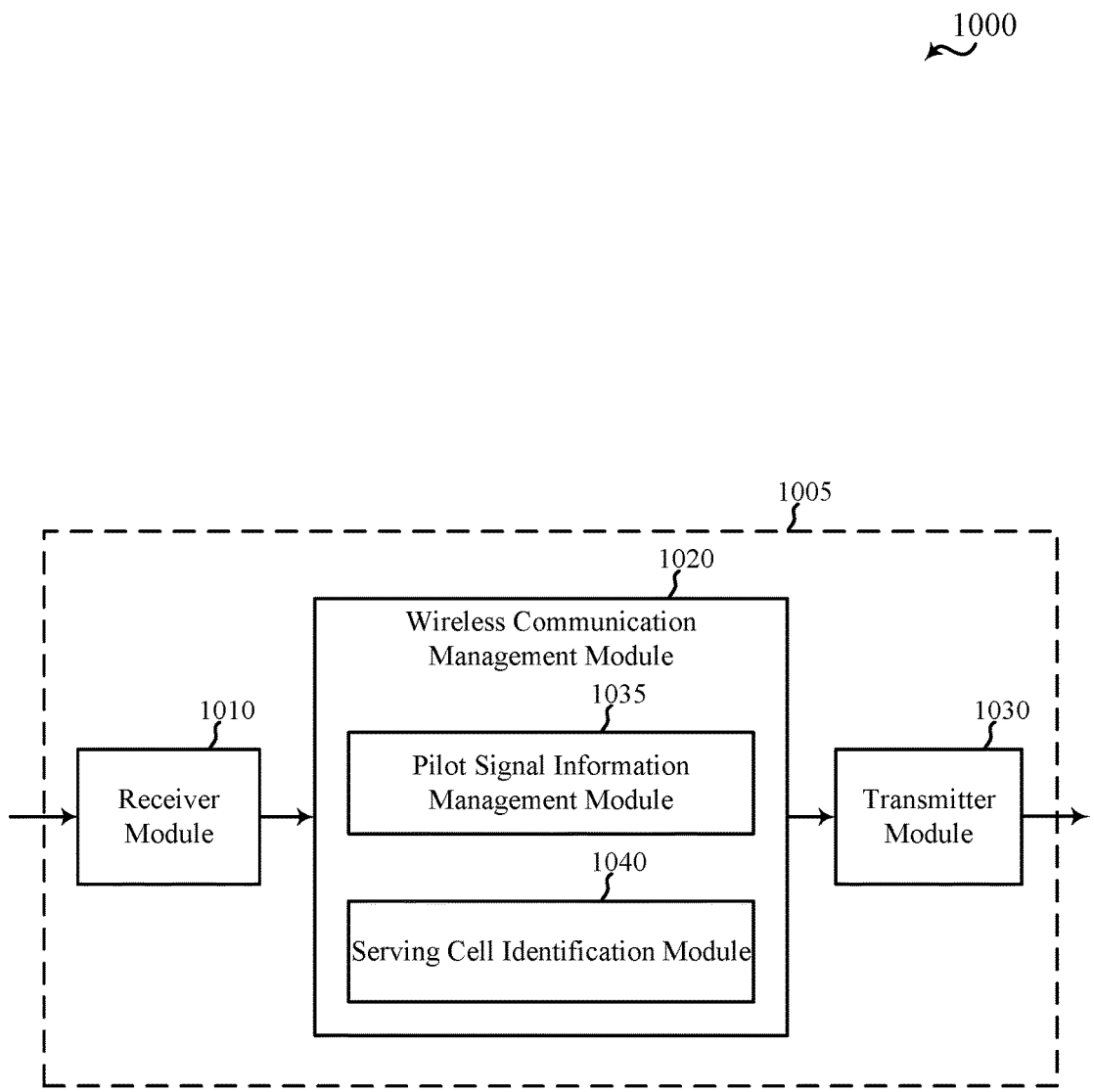
FIG. 10 shows a block diagram of a central node for use in wireless communication, in accordance with various aspects of the present disclosure.

FIG. 10 shows a block diagram 1000 of a central node 1005 for use in wireless communication, in accordance with various aspects of the present disclosure. In some examples, the central node 1005 may be a node of the core network 130 described with reference to FIG. 1. The central node 1005 may also be or include a processor. The central node 1005 may include a receiver module 1010, a wireless communication management module 1020, or a transmitter module 1030. Each of these modules may be in communication with each other.

The modules of the central node 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1010 may include at least one backhaul receiver. The backhaul receiver may be used for communicating with base stations, such as one or more of the base stations 105 described with reference to FIG. 1, 8, or 9. The receiver module 1010 or backhaul receiver may be used to receive various types of data or control signals (i.e., transmissions) over one or more communication links of a wireless communication system, such as one or more communication links or backhaul links of the wireless communication system 100 described with reference to FIG. 1.

In some examples, the transmitter module 1030 may include at least one backhaul transmitter. The backhaul transmitter may be used for communicating with base stations, such as one or more of the base stations 105 described with reference to FIG. 1, 8, or 9. The transmitter module 1030 or backhaul transmitter may be used to transmit various types of data or control signals (i.e., transmissions) over one or more communication links of a wireless communication system, such as one or more communication links or backhaul links of the wireless communication system 100 described with reference to FIG. 1.

The wireless communication management module 1020 may be used to manage one or more aspects of wireless communication for one or more base stations in communication with the central node 1005 or one or more UEs in communication with the one or more base stations. In some examples, the wireless communication management module 1020 may include a pilot signal information management module 1035 or a serving cell identification module 1040.

The pilot signal information management module 1035 may be used to receive, from each of a plurality of cells, information on a pilot signal transmitted by a UE.

The serving cell identification module 1040 may be used to identify, from among the plurality of cells, and based at least in part on the information on the pilot signal received from one or more of the plurality of cells, a serving cell for the UE.

Figure 11:
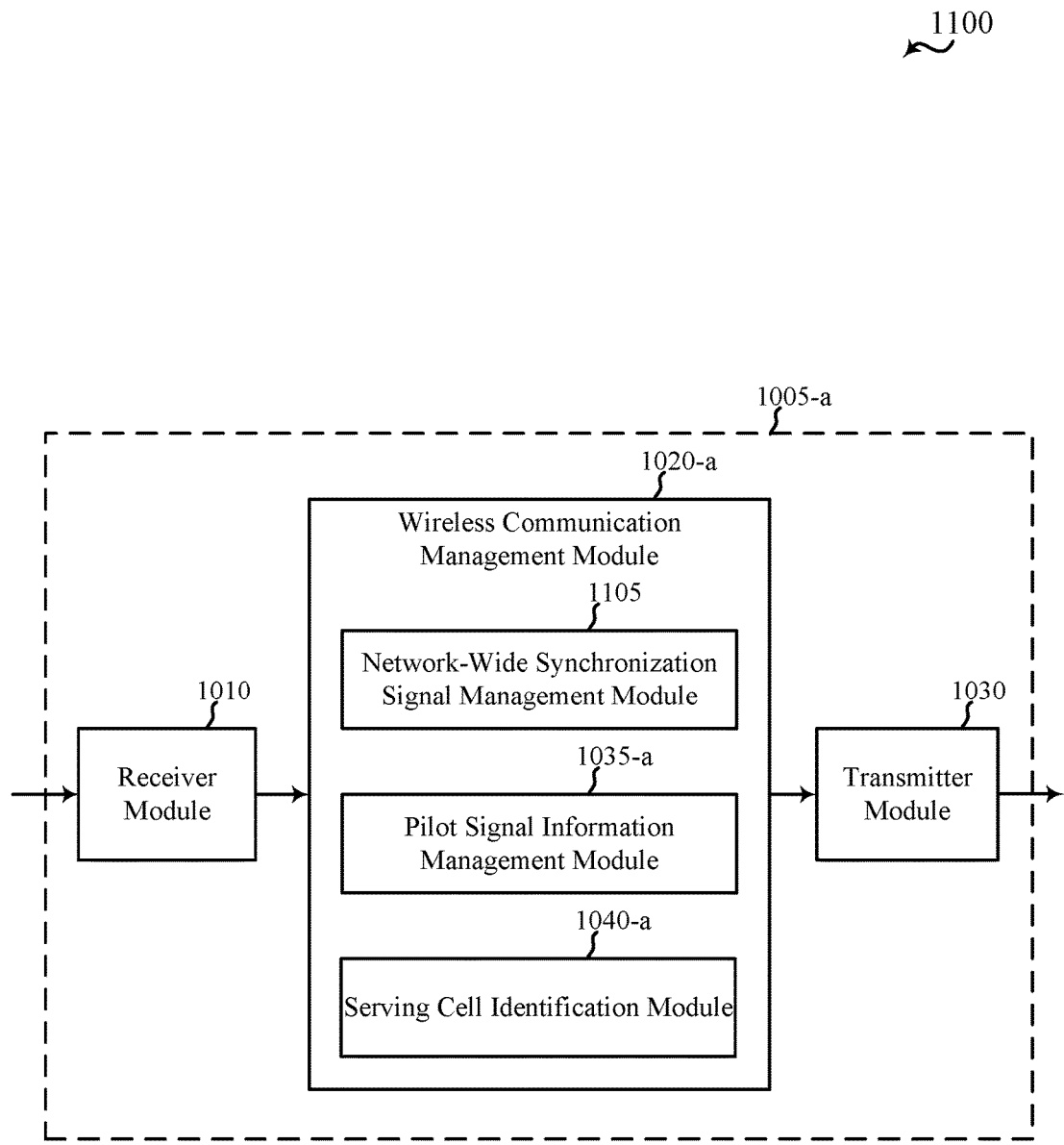
FIG. 11 shows a block diagram of a central node for use in wireless communication, in accordance with various aspects of the present disclosure.

FIG. 11 shows a block diagram 1100 of a central node 1005-*a* for use in wireless communication, in accordance with various aspects of the present disclosure. In some examples, the central node 1005-*a* may be a node of the core network 130 described with reference to FIG. 1. The central node 1005-*a* may also be or include a processor. The central node 1005-*a* may include a receiver module 1010, a wireless communication management module 1020-*a*, or a transmitter module 1030. Each of these modules may be in communication with each other.

The modules of the central node 1005-*a* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some embodiments, the receiver module 1010 or transmitter module 1030 may be configured as described with reference to FIG. 10.

The wireless communication management module 1020-*a* may be used to manage one or more aspects of wireless communication for one or more base stations in communication with the central node 1005-*a* or one or more UEs in communication with the one or more base stations. In some examples, the wireless communication management module 1020-*a* may include a synchronization signal management module 1105, a pilot signal information management module 1035-*a* or a serving cell identification module 1040-*a*.

The synchronization signal management module 1105 may be used to establish a synchronization signal for transmission by a plurality of cells in a network, to a number of UEs. The synchronization signal may be common (e.g., non-cell specific) to the plurality of cells, and may be received from at least one of the plurality of cells (e.g., from at least one of a plurality of base stations in the cells) as a SFN broadcast. The synchronization signal need not include a cell identifier. In some examples, the synchronization signal may be a periodic signal. In some embodiments, the synchronization signal may include system information request (e.g., SIB request) configuration information. The configuration information may, in some examples, include at least one of an indication of a SIB request bandwidth, an indication of a SIB request timing (e.g., slot/symbol timing), a portion of a constellation identifier, or network access barring information (e.g., an indication of times when UEs of particular types may not transmit a SIB request). In some embodiments, the synchronization signal management module 1105 may provide an indication of the synchronization signal to each of the plurality of cells, and the synchronization signal may be broadcast synchronously by the plurality of cells.

The pilot signal information management module 1035-*a* may be used to receive, from each of the plurality of cells, information on a pilot signal transmitted by a UE.

The serving cell identification module 1040-*a* may be used to identify, from among the plurality of cells, and based at least in part on the information on the pilot signal received from one or more of the plurality of cells, a serving cell for the UE.

Figure 12:
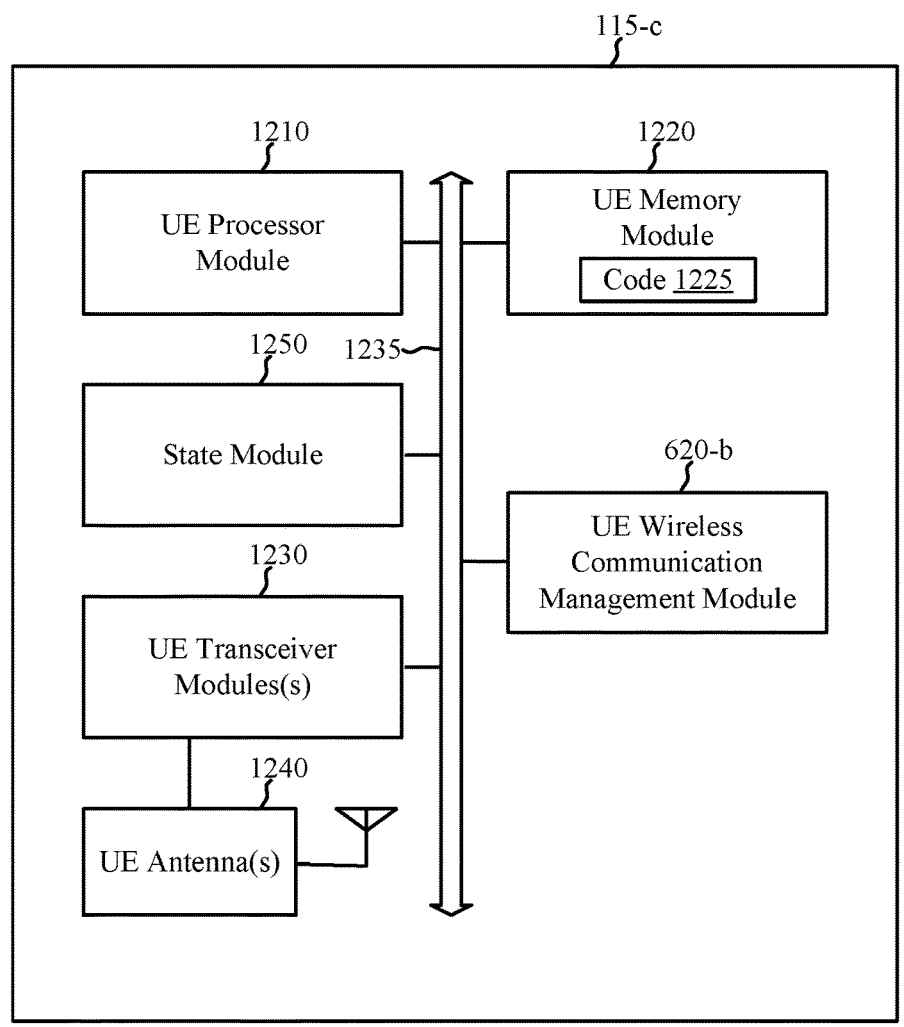
FIG. 12 shows a block diagram of a UE for use in wireless communication, in accordance with various aspects of the present disclosure.

FIG. 12 shows a block diagram 1200 of a UE 115-*c* for use in wireless communication, in accordance with various aspects of the present disclosure. The UE 115-*c* may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, entertainment device, vehicular component, etc. The UE 115-*c* may, in some examples, have an internal power supply (not shown), such as a small battery, to facilitate mobile operation. In some examples, the UE 115-*c* may be an example of aspects of one or more of the UEs 115 described with reference to FIG. 1, 6, or 7. The UE 115-*c* may be configured to implement at least some of the UE features and functions described with reference to FIG. 1, 2, 3, 4, 5, 6, or 7.

The UE 115-*c* may include a UE processor module 1210, a UE memory module 1220, at least one UE transceiver module (represented by UE transceiver module(s) 1230), at least one UE antenna (represented by UE antenna(s) 1240), or a UE wireless communication management module 620-*b*. Each of these components may be in communication with each other, directly or indirectly, over one or more buses 1235.

The UE memory module 1220 may include random access memory (RAM) or read-only memory (ROM). The UE memory module 1220 may store computer-readable, computer-executable code 1225 containing instructions that are configured to, when executed, cause the UE processor module 1210 to perform various functions described herein related to wireless communication, including, for example, transmissions of a pilot signal. Alternatively, the code 1225 may not be directly executable by the UE processor module 1210 but be configured to cause the UE 115-*c* (e.g., when compiled and executed) to perform various of the functions described herein.

The UE processor module 1210 may include an intelligent hardware device, e.g., a central processing unit (CPU), a microcontroller, an ASIC, etc. The UE processor module 1210 may process information received through the UE transceiver module(s) 1230 or information to be sent to the UE transceiver module(s) 1230 for transmission through the UE antenna(s) 1240. The UE processor module 1210 may handle, alone or in connection with the UE wireless communication management module 620-*b*, various aspects of communicating over (or managing communications over) a wireless medium.

The UE transceiver module(s) 1230 may include a modem configured to modulate packets and provide the modulated packets to the UE antenna(s) 1240 for transmission, and to demodulate packets received from the UE antenna(s) 1240. The UE transceiver module(s) 1230 may, in some examples, be implemented as one or more UE transmitter modules and one or more separate UE receiver modules. The UE transceiver module(s) 1230 may support communications on one or more wireless channels. The UE transceiver module(s) 1230 may be configured to communicate bi-directionally, via the UE antenna(s) 1240, with one or more base stations, such as one or more of the base stations 105 described with reference to FIG. 1, 8, or 9. While the UE 115-*c* may include a single UE antenna, there may be examples in which the UE 115-*c* may include multiple UE antennas 1240.

The UE state module 1250 may be used, for example, to manage transitions of the UE 115-*c* between RRC connected states, and may be in communication with other components of the UE 115-*c*, directly or indirectly, over the one or more buses 1235. The UE state module 1250, or portions of it, may include a processor, and/or some or all of the functions of the UE state module 1250 may be performed by the UE processor module 1210, in connection with the UE processor module 1210, or in connection with the UE wireless communication management module 620-*b*.

The UE wireless communication management module 620-*b* may be configured to perform or control some or all of the UE features or functions described with reference to FIG. 1, 2, 3, 4, 5, 6, or 7 related to wireless communication. The UE wireless communication management module 620-

*b*, or portions of it, may include a processor, or some or all of the functions of the UE wireless communication management module 620-*b* may be performed by the UE processor module 1210 or in connection with the UE processor module 1210. In some examples, the UE wireless communication management module 620-*b* may be an example of the wireless communication management module 620 described with reference to FIG. 6 or 7.

Figure 13:
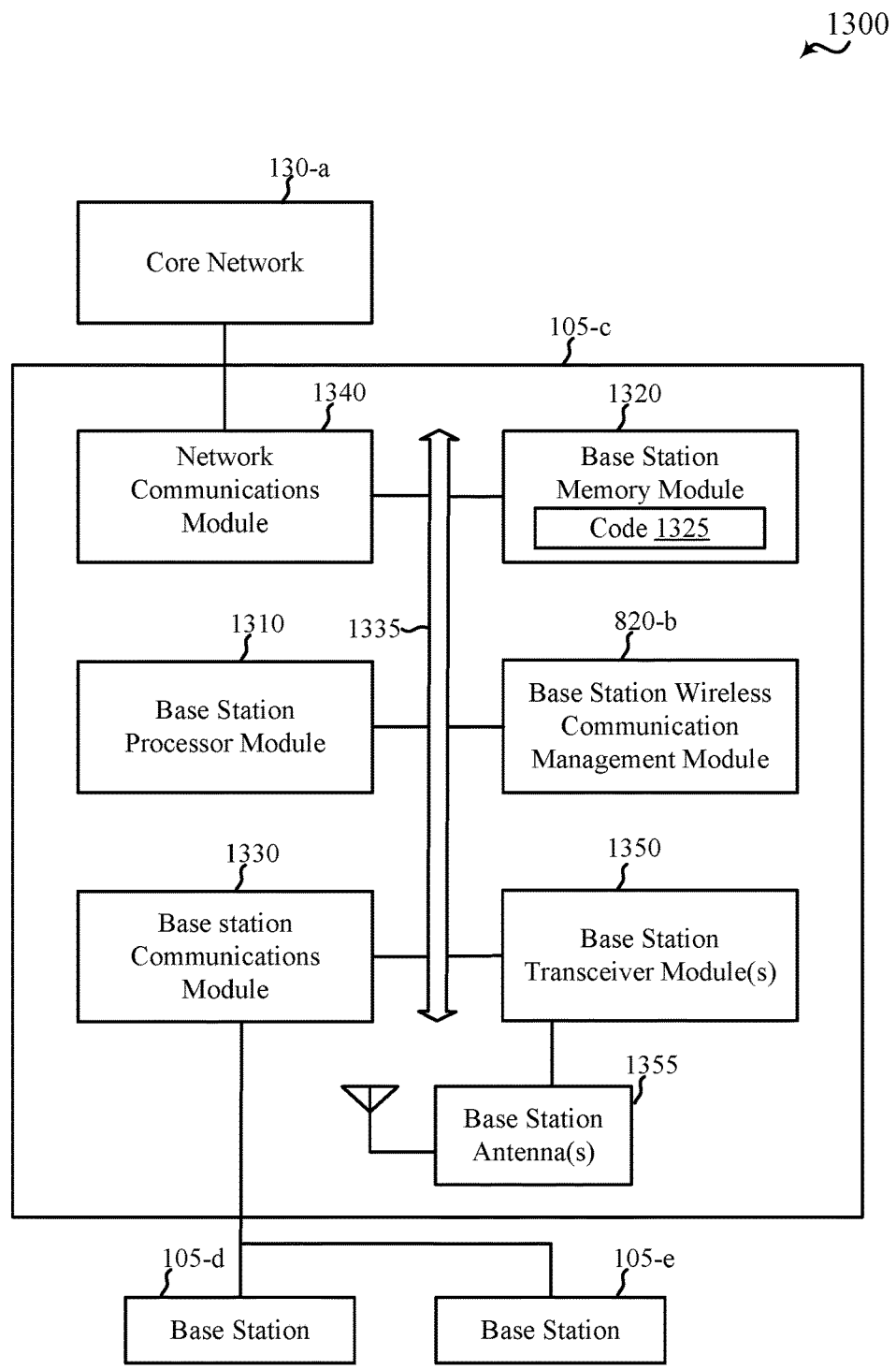
FIG. 13 shows a block diagram of a base station (e.g., a base station forming part or all of an eNB) for use in wireless communication, in accordance with various aspects of the present disclosure.

FIG. 13 shows a block diagram 1300 of a base station 105-*c* (e.g., a base station forming part or all of an eNB) for use in wireless communication, in accordance with various aspects of the present disclosure. In some examples, the base station 105-*c* may be an example of one or more aspects of the base station 105 described with reference to FIG. 1, 8, or 9. The base station 105-*c* may be configured to implement or facilitate at least some of the base station features and functions described with reference to FIG. 1, 2, 3, 4, 5, 8, or 9.

The base station 105-*c* may include a base station processor module 1310, a base station memory module 1320, at least one base station transceiver module (represented by base station transceiver module(s) 1350), at least one base station antenna (represented by base station antenna(s) 1355), or a base station wireless communication management module 820-*b*. The base station 105-*c* may also include one or more of a base station communications module 1330 or a network communications module 1340. Each of these components may be in communication with each other, directly or indirectly, over one or more buses 1335.

The base station memory module 1320 may include RAM or ROM. The base station memory module 1320 may store computer-readable, computer-executable code 1325 containing instructions that are configured to, when executed, cause the base station processor module 1310 to perform various functions described herein related to wireless communication, including, for example, transmission of a synchronization signal. Alternatively, the code 1325 may not be directly executable by the base station processor module 1310 but be configured to cause the base station 105-*g* (e.g., when compiled and executed) to perform various of the functions described herein.

The base station processor module 1310 may include an intelligent hardware device, e.g., a CPU, a microcontroller, an ASIC, etc. The base station processor module 1310 may process information received through the base station transceiver module(s) 1350, the base station communications module 1330, or the network communications module 1340. The base station processor module 1310 may also process information to be sent to the transceiver module(s) 1350 for transmission through the base station antenna(s) 1355, to the base station communications module 1330, for transmission to one or more other base stations 105-*d* and 105-*e*, or to the network communications module 1340 for transmission to a core network 130-*a*, which may be an example of one or more aspects of the core network 130 described with reference to FIG. 1. The base station processor module 1310 may handle, alone or in connection with the base station wireless communication management module 820-*b*, various aspects of communicating over (or managing communications over) a wireless medium.

The base station transceiver module(s) 1350 may include a modem configured to modulate packets and provide the modulated packets to the base station antenna(s) 1355 for transmission, and to demodulate packets received from the base station antenna(s) 1355. The base station transceiver module(s) 1350 may, in some examples, be implemented as one or more base station transmitter modules and one or more separate base station receiver modules. The base station transceiver module(s) 1350 may support communications on one or more wireless channels. The base station transceiver module(s) 1350 may be configured to communicate bi-directionally, via the base station antenna(s) 1355, with one or more UEs, such as one or more of the UEs 115 described with reference to FIG. 1, 6, 7, or 12. The base station 105-*c* may, for example, include multiple base station antennas 1355 (e.g., an antenna array). The base station 105-*c* may communicate with the core network 130-*a* through the network communications module 1340. The base station 105-*c* may also communicate with other base stations, such as the base stations 105-*d* and 105-*e*, using the base station communications module 1330.

The base station wireless communication management module 820-*b* may be configured to perform or control some or all of the base station features or functions described with reference to FIG. 1, 2, 3, 4, 5, 8, or 9 related to wireless communication. The base station wireless communication management module 820-*b*, or portions of it, may include a processor, or some or all of the functions of the base station wireless communication management module 820-*b* may be performed by the base station processor module 1310 or in connection with the base station processor module 1310. In some examples, the base station wireless communication management module 820-*b* may be an example of the wireless communication management module 820 described with reference to FIG. 8 or 9.

Figure 14:
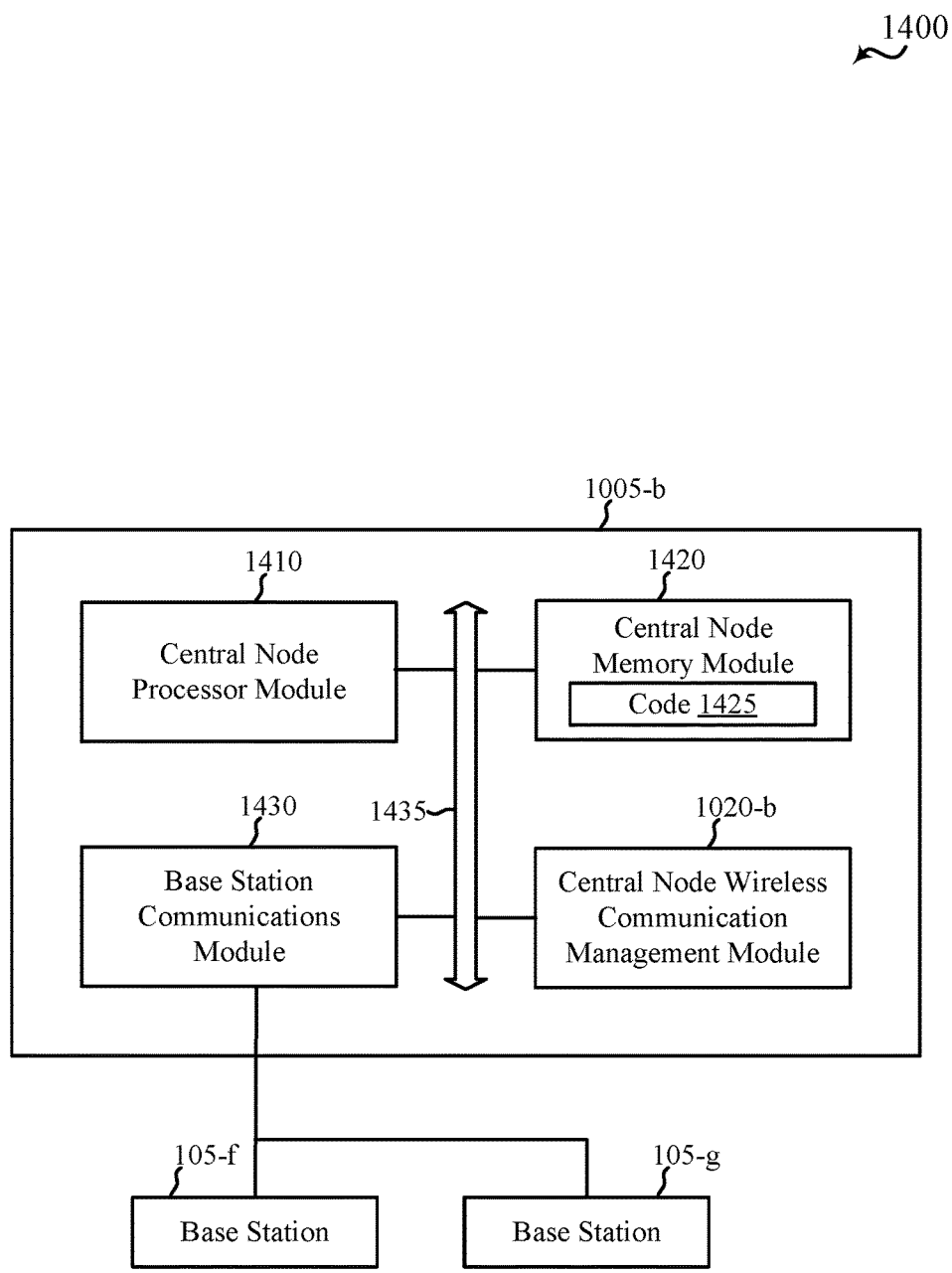
FIG. 14 shows a block diagram of a central node, in accordance with various aspects of the present disclosure.

FIG. 14 shows a block diagram 1400 of a central node 1005-*b*, in accordance with various aspects of the present disclosure. In some examples, the central node 1005-*b* may be an example of aspects of one or more of the central nodes 1005 described with reference to FIG. 10 or 11. In some examples, the central node 1005-*b* may be a node of the core network 130 described with reference to FIG. 1. The central node 1005-*b* may be configured to implement at least some of the central node features and functions described with reference to FIG. 2, 3, 4, 5, 10, or 11.

The central node 1005-*b* may include a central node processor module 1410, a central node memory module 1420, a base station communications module 1430, or a central node wireless communication management module 1020-*b*. Each of these components may be in communication with each other, directly or indirectly, over one or more buses 1435.

The central node memory module 1420 may include RAM or ROM. The central node memory module 1420 may store computer-readable, computer-executable code 1425 containing instructions that are configured to, when executed, cause the central node processor module 1410 to perform various functions described herein related to wireless communication, including, for example, an identification of serving cells for each of a number of UEs. Alternatively, the code 1425 may not be directly executable by the central node processor module 1410 but be configured to cause the central node 1005-*b* (e.g., when compiled and executed) to perform various of the functions described herein.

The central node processor module 1410 may include an intelligent hardware device, e.g., a CPU, a microcontroller, an ASIC, etc. The central node processor module 1410 may process information received through the base station communications module 1430 or information to be sent to one or more base stations via the base station communications module 1430. The central node processor module 1410 may handle, alone or in connection with the central node wireless communication management module 1020-*b*, various aspects of communicating over (or managing communications over) a wireless medium.

The base station communications module 1430 may be used by the central node 1005-b to communicate with one or more base stations 105-f and 105-g. The base station communications module 1430 may be configured to communicate bi-directionally with the one or more base stations 105-f and 105-g. In some examples, the base stations 105-f and 105-g may be examples of aspects of one or more of the base stations 105 described with reference to FIG. 1, 8, or 9.

The central node wireless communication management module 1020-b may be configured to perform or control some or all of the central node features or functions described with reference to FIG. 1, 2, 3, 4, 5, 10, or 11 related to wireless communication between base stations and UEs. The central node wireless communication management module 1020-b, or portions of it, may include a processor, or some or all of the functions of the central node wireless communication management module 1020-b may be performed by the central node processor module 1410 or in connection with the central node processor module 1410. In some examples, the central node wireless communication management module 1020-b may be an example of the wireless communication management module 1020 described with reference to FIG. 10 or 11.

Figure 15:
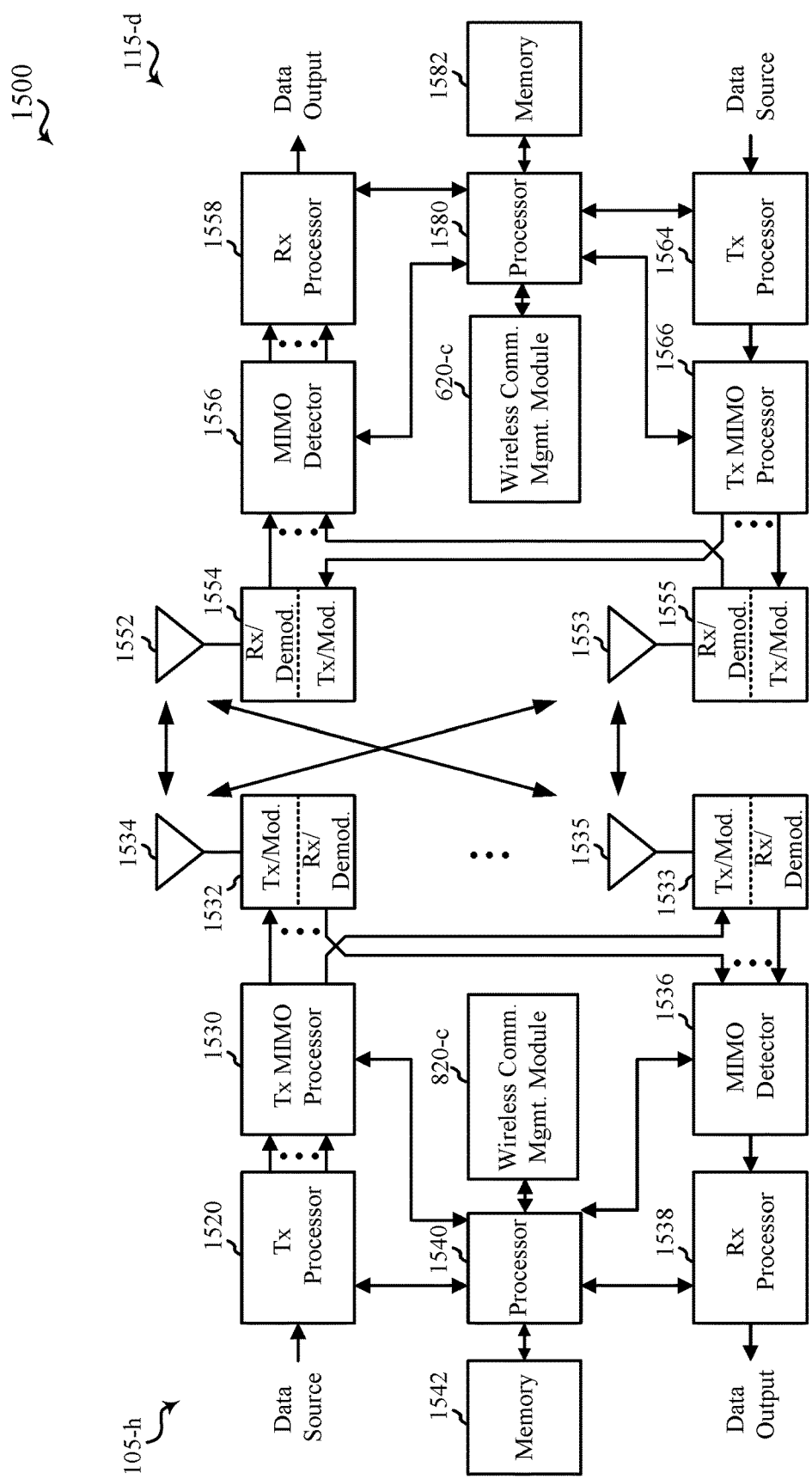
FIG. 15 is a block diagram of a MIMO communication system including a base station and a UE, in accordance with various aspects of the present disclosure.

FIG. 15 is a block diagram of a MIMO communication system 1500 including a base station 105-h and a UE 115-d, in accordance with various aspects of the present disclosure. The MIMO communication system 1500 may illustrate aspects of the wireless communication system 100 described with reference to FIG. 1. The base station 105-h may be an example of aspects of the base station 105 described with reference to FIG. 1, 8, 9, or 13. The base station 105-h may be equipped with antennas 1534 and 1535, and the UE 115-d may be equipped with antennas 1552 and 1553. In the MIMO communication system 1500, the base station 105-h may be able to send data over multiple communication links at the same time. Each communication link may be called a "layer" and the "rank" of the communication link may indicate the number of layers used for communication. For example, in a 2×2 MIMO communication system where base station 105-h transmits two "layers," the rank of the communication link between the base station 105-h and the UE 115-d is two.

At the base station 105-h, a transmit (Tx) processor 1520 may receive data from a data source. The transmit processor 1520 may process the data. The transmit processor 1520 may also generate control symbols or reference symbols. A transmit MIMO processor 1530 may perform spatial processing (e.g., precoding) on data symbols, control symbols, or reference symbols, if applicable, and may provide output symbol streams to the transmit modulator/demodulators 1532 and 1533. Each modulator/demodulator 1532 through 1533 may process a respective output symbol stream (e.g., for OFDM, etc.) to obtain an output sample stream. Each modulator/demodulator 1532 through 1533 may further process (e.g., convert to analog, amplify, filter, and upconvert) the output sample stream to obtain a DL signal. In one example, DL signals from modulator/demodulators 1532 and 1533 may be transmitted via the antennas 1534 and 1535, respectively.

The UE 115-d may be an example of aspects of the UEs 115 described with reference to FIG. 1, 6, 7, or 12. At the UE 115-d, the UE antennas 1552 and 1553 may receive the DL signals from the base station 105-h and may provide the received signals to the modulator/demodulators 1554 and 1555, respectively. Each modulator/demodulator 1554 through 1555 may condition (e.g., filter, amplify, downconvert, and digitize) a respective received signal to obtain input samples. Each modulator/demodulator 1554 through 1555 may further process the input samples (e.g., for OFDM, etc.) to obtain received symbols. A MIMO detector 1556 may obtain received symbols from the modulator/demodulators 1554 and 1555, perform MIMO detection on the received symbols, if applicable, and provide detected symbols. A receive (Rx) processor 1558 may process (e.g., demodulate, deinterleave, and decode) the detected symbols, providing decoded data for the UE 115-d to a data output, and provide decoded control information to a processor 1580, or memory 1582.

The processor 1580 may in some cases execute stored instructions to instantiate a UE wireless communication management module 620-c. The UE wireless communication management module 620-c may be an example of aspects of the wireless communication management module 620 described with reference to FIG. 6, 7, or 12.

On the uplink (UL), at the UE 115-d, a transmit processor 1564 may receive and process data from a data source. The transmit processor 1564 may also generate reference symbols for a reference signal. The symbols from the transmit processor 1564 may be precoded by a transmit MIMO processor 1566 if applicable, further processed by the modulator/demodulators 1554 and 1555 (e.g., for SC-FDMA, etc.), and be transmitted to the base station 105-h in accordance with the communication parameters received from the base station 105-h. At the base station 105-h, the UL signals from the UE 115-d may be received by the antennas 1534 and 1535, processed by the modulator/demodulators 1532 and 1533, detected by a MIMO detector 1536 if applicable, and further processed by a receive processor 1538. The receive processor 1538 may provide decoded data to a data output and to the processor 1540 or memory 1542.

The processor 1540 may in some cases execute stored instructions to instantiate a base station wireless communication management module 820-c. The base station wireless communication management module 820-c may be an example of aspects of the wireless communication management module 820 described with reference to FIG. 8, 9, or 13.

The components of the UE 115-d may, individually or collectively, be implemented with one or more ASICs adapted to perform some or all of the applicable functions in hardware. Each of the noted modules may be a means for performing one or more functions related to operation of the MIMO communication system 1500. Similarly, the components of the base station 105-h may, individually or collectively, be implemented with one or more ASICs adapted to perform some or all of the applicable functions in hardware. Each of the noted components may be a means for performing one or more functions related to operation of the MIMO communication system 1500.

Figure 16:
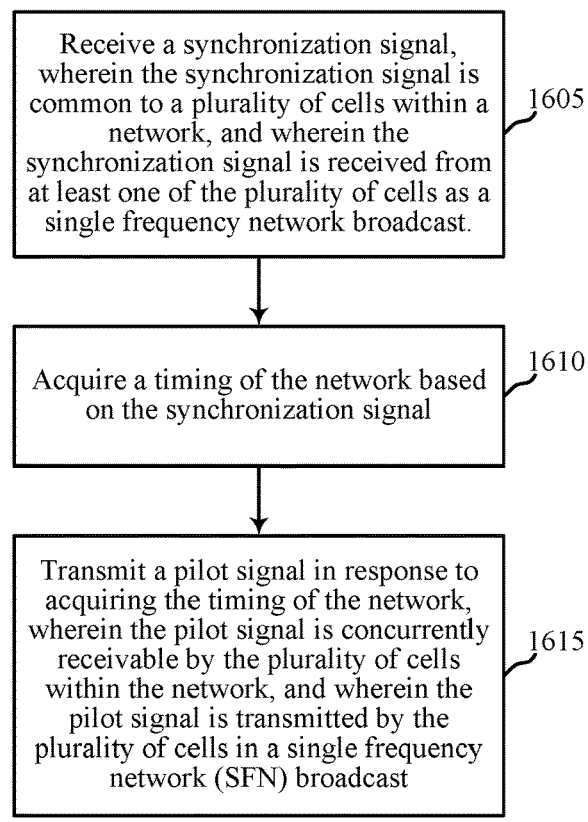
FIG. 16 is a flow chart illustrating an example of a method for wireless communication at a UE, in accordance with various aspects of the present disclosure.

FIG. 16 is a flow chart illustrating an example of a method 1600 for wireless communication at a UE, in accordance with various aspects of the present disclosure. For clarity, the method 1600 is described below with reference to aspects of one or more of the UEs 115 described with reference to FIG. 1, 6, 7, 12, or 15. In some examples a UE may execute one or more sets of codes to control the functional elements of the UE to perform the functions described below. In some examples, the method 1600 may be performed by a UE during an initial access procedure.

At block 1605, a UE may receive a synchronization signal. The synchronization signal may be common (e.g., non-cell specific) to a plurality of cells within a network, and may be received from at least one of the plurality of cells (e.g., from at least one of a plurality of base stations in the cells) as a SFN broadcast. The synchronization signal need not include a cell identifier. In some examples, the synchronization signal may be a periodic signal. In some embodiments, the synchronization signal may include system information request (e.g., SIB request) configuration information. The configuration information may, in some examples, include at least one of an indication of a SIB request bandwidth, an indication of a SIB request timing (e.g., slot/symbol timing), a portion of a constellation identifier, or network access barring information (e.g., an indication of times when UEs of particular types may not transmit a SIB request). The operation(s) at block 1605 may be performed using the wireless communication management module 620 described with reference to FIG. 6, 7, 12, or 15, or the synchronization signal processing module 635 described with reference to FIG. 6 or 7.

At block 1610, the UE may acquire a timing of the network based on the synchronization signal. The operation(s) at block 1610 may be performed using the wireless communication management module 620 described with reference to FIG. 6, 7, 12, or 15, or the network timing acquisition module 640 described with reference to FIG. 6 or 7.

At block 1615, the UE may transmit a pilot signal in response to acquiring the timing of the network. The pilot signal may be concurrently receivable by the plurality of cells within the network. In some embodiments, the pilot signal may include a spatial signature (e.g., an SRS). In some embodiments, the pilot signal may be transmitted in a SIB request occasion indicated by system information request configuration information received with the synchronization signal, and may be transmitted with a random sequence usable by a base station to temporarily identify the UE during initial acquisition. The operation(s) at block 1615 may be performed using the wireless communication management module 620 described with reference to FIG. 6, 7, 12, or 15, or the pilot signal transmission management module 645 described with reference to FIG. 6 or 7. Further examples of the synchronization signal or pilot signal are described with reference to FIG. 2.

Thus, the method 1600 may provide for wireless communication. It should be noted that the method 1600 is just one implementation and that the operations of the method 1600 may be rearranged or otherwise modified such that other implementations are possible.

Figure 17:
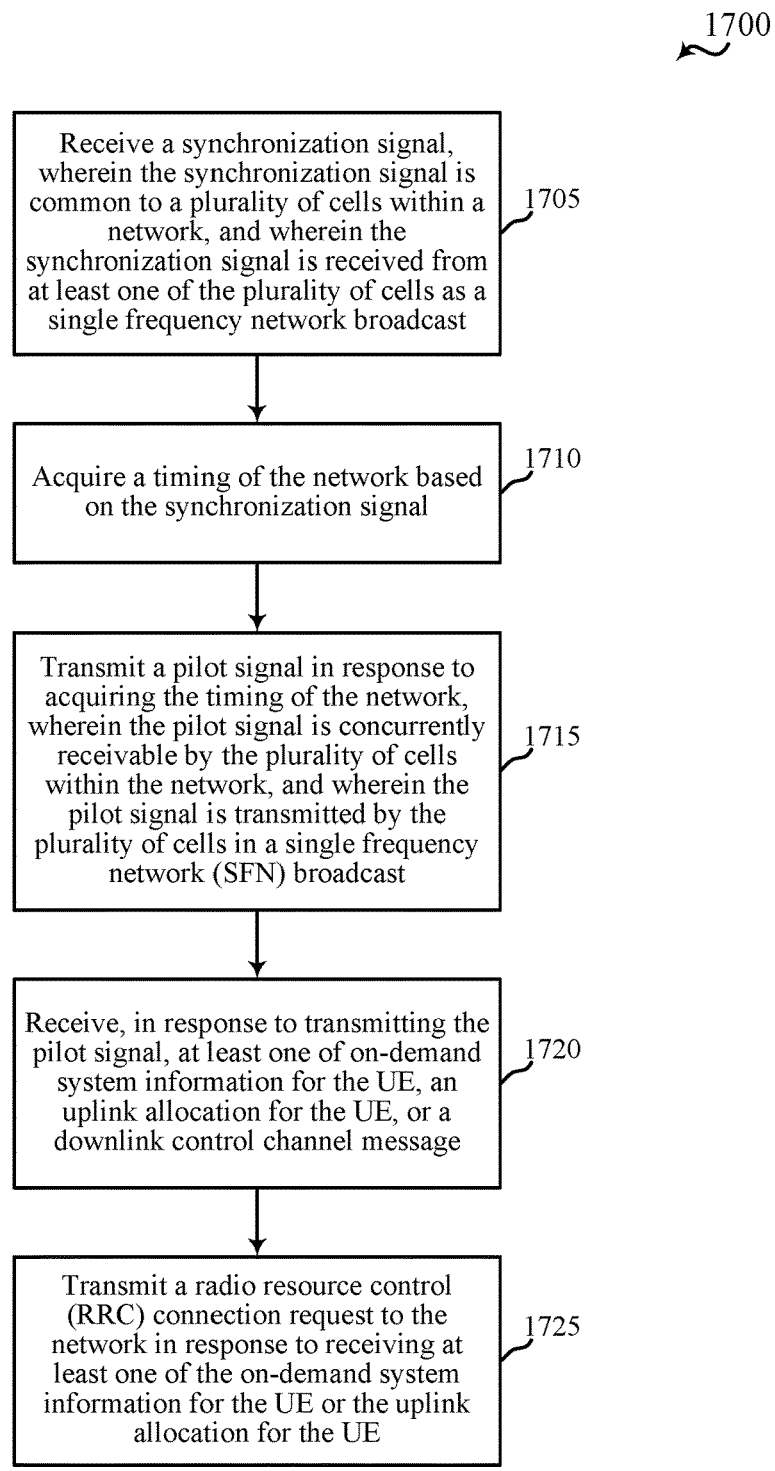
FIG. 17 is a flow chart illustrating an example of a method for wireless communication at a UE, in accordance with various aspects of the present disclosure.

FIG. 17 is a flow chart illustrating an example of a method 1700 for wireless communication at a UE, in accordance with various aspects of the present disclosure. For clarity, the method 1700 is described below with reference to aspects of one or more of the UEs 115 described with reference to FIG. 1, 6, 7, 12, or 15. In some examples a UE may execute one or more sets of codes to control the functional elements of the UE to perform the functions described below. In some examples, the method 1700 may be performed by a UE during an initial access procedure.

At block 1705, a UE may receive a synchronization signal. The synchronization signal may be common (e.g., non-cell specific) to a plurality of cells within a network, and may be received from at least one of the plurality of cells (e.g., from at least one of a plurality of base stations in the cells) as a SFN broadcast. The synchronization signal need not include a cell identifier. In some examples, the synchronization signal may be a periodic signal. In some embodiments, the synchronization signal may include system information request (e.g., SIB request) configuration information. The configuration information may, in some examples, include at least one of an indication of a SIB request bandwidth, an indication of a SIB request timing (e.g., slot/symbol timing), a portion of a constellation identifier, or network access barring information (e.g., an indication of times when UEs of particular types may not transmit a SIB request). The operation(s) at block 1705 may be performed using the wireless communication management module 620 described with reference to FIG. 6, 7, 12, or 15, or the synchronization signal processing module 635 described with reference to FIG. 6 or 7.

At block 1710, the UE may acquire a timing of the network based on the synchronization signal. The operation(s) at block 1710 may be performed using the wireless communication management module 620 described with reference to FIG. 6, 7, 12, or 15, or the network timing acquisition module 640 described with reference to FIG. 6 or 7.

At block 1715, the UE may transmit a pilot signal in response to acquiring the timing of the network. The pilot signal may be concurrently receivable by the plurality of cells within the network. In some embodiments, the pilot signal may include a spatial signature (e.g., an SRS). In some embodiments, the pilot signal may be transmitted in a SIB request occasion indicated by system information request configuration information received with the synchronization signal, and may be transmitted with a random sequence usable by a base station to temporarily identify the UE during initial acquisition. The operation(s) at block 1715 may be performed using the wireless communication management module 620 described with reference to FIG. 6, 7, 12, or 15, or the pilot signal transmission management module 645 described with reference to FIG. 6 or 7. Further examples of the synchronization signal or pilot signal are described with reference to FIG. 2.

At block 1720, the UE may receive, in response to transmitting the pilot signal, at least one of on-demand system information for the UE an uplink allocation for the UE, or a downlink control channel message. The on-demand system information for the UE or the uplink allocation for the UE may include the random sequence transmitted with the pilot signal, and in some embodiments may include an identifier of the UE. The operation(s) at block 1720 may be performed using the wireless communication management module 620 described with reference to FIG. 6, 7, 12, or 15, or the system information processing module 705 or uplink/downlink allocation processing module 710 described with reference to FIG. 7.

At block 1725, the UE may transmit an RRC connection request to the network in response to receiving at least one of the on-demand system information for the UE or the uplink allocation for the UE. The operation(s) at block 1725 may be performed using the wireless communication management module 620 described with reference to FIG. 6, 7, 12, or 15, or the RRC connection management module 715 described with reference to FIG. 7.

Thus, the method 1700 may provide for wireless communication. It should be noted that the method 1700 is just one implementation and that the operations of the method 1700 may be rearranged or otherwise modified such that other implementations are possible.

Figure 18:
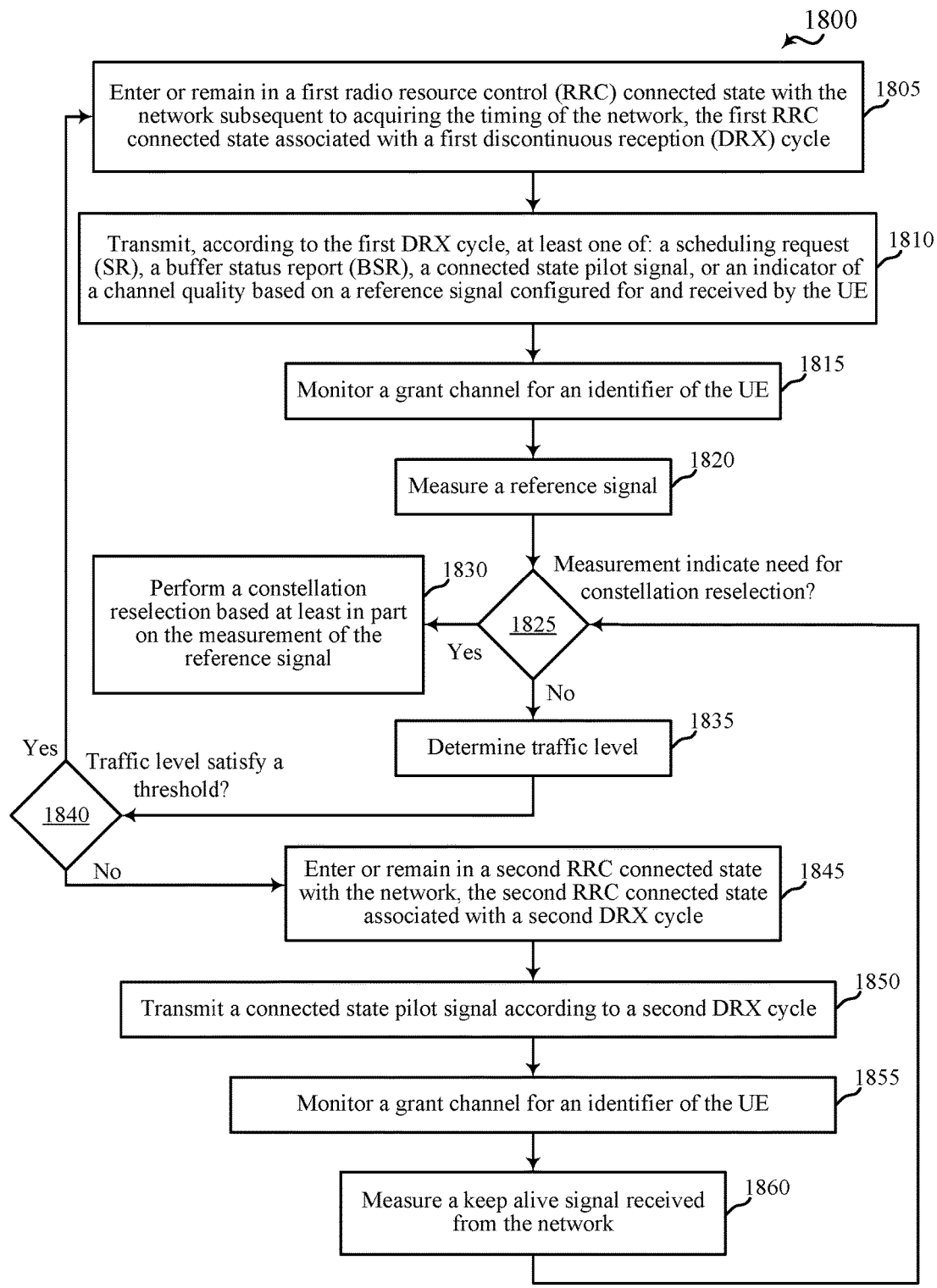
FIG. 18 is a flow chart illustrating an example of a method for wireless communication at a UE, in accordance with various aspects of the present disclosure.

FIG. 18 is a flow chart illustrating an example of a method 1800 for wireless communication at a UE, in accordance with various aspects of the present disclosure. For clarity, the method 1800 is described below with reference to aspects of one or more of the UEs 115 described with reference to FIG. 1, 6, 7, 12, or 15. In some examples a UE may execute one or more sets of codes to control the functional elements of the UE to perform the functions described below. in some embodiments, the method 1800 may begin with a UE commencing entry into an RRC connected state (e.g., a first RRC connected state), as described with reference to block 1725 of FIG. 17. The UE may then switch between a plurality of RRC connected states, including the first RRC connected state, based at least in part on a determined traffic level (e.g., a traffic level between the UE and the network).

At block 1805, the UE may enter or remain in a first RRC connected state with a network. In some embodiments, the first RRC connected state may be associated with a first DRX cycle. The operation(s) at block 1805 may be performed using the wireless communication management module 620 described with reference to FIG. 6, 7, 12, or 15, or the RRC connection management module 715 described with reference to FIG. 7.

At block 1810, and when operating in the first RRC connected state, the UE may transmit, according to the first DRX cycle, at least one of: an SR, a BSR, a connected state pilot signal (e.g., an SRS), or an indicator of a channel quality based on a reference signal configured for and received by the UE. The connected state pilot signal may be transmitted using resources (e.g., time and frequency resources) identified by the network for the UE, and may include an identifier of the UE. The operation(s) at block 1810 may be performed using the wireless communication management module 620 described with reference to FIG. 6, 7, 12, or 15, the pilot signal transmission management module 645 described with reference to FIG. 6 or 7, or the scheduling request management module 720, buffer status report management module 725, or CQI management module 730 described with reference to FIG. 7.

At block 1815, and when operating in the first RRC connected state, the UE may monitor a grant channel for the identifier of the UE. The grant channel may carry, for example, paging signals or uplink grants for the UE. The operation(s) at block 1815 may be performed using the wireless communication management module 620 described with reference to FIG. 6, 7, 12, or 15, or the grant management module 735 described with reference to FIG. 7.

At block 1820, and when operating in the first RRC connected state, the UE may measure a reference signal. In some embodiments, the reference signal may include a reference signal configured for and received by the UE (e.g., the reference signal on which the indicator of the channel quality, transmitted at block 1910, is based). In some embodiments, the reference signal may include a CSI-RS or beamformed CSI-RS received from the network. The operation(s) at block 1820 may be performed using the wireless communication management module 620 described with reference to FIG. 6, 7, 12, or 15, or the measurement module 740 described with reference to FIG. 7.

At block 1825, and when operating in the first RRC connected state, the UE may determine, based at least in part on the measurement of the reference signal at block 1820, whether to perform a constellation reselection. When a determination is made to perform a constellation reselection, the method 1800 may continue at block 1830. When a determination is made to not perform a constellation reselection, the method 1800 may continue at block 1835. The operation(s) at block 1825 may be performed using the wireless communication management module 620 described with reference to FIG. 6, 7, 12, or 15, or the constellation reselection module 745 described with reference to FIG. 7.

At block 1830, the UE may perform a constellation reselection based at least in part on a measurement of the keep alive signal or a decoding error of the keep alive signal performed at block 1820. Upon selecting a new constellation, the UE may transmit a pilot signal in response to a second synchronization signal received from the new constellation. The operation(s) at block 1830 may be performed using the wireless communication management module 620 described with reference to FIG. 6, 7, 12, or 15, or the constellation reselection module 745 described with reference to FIG. 7.

At block 1835, the UE may determine a traffic level. In some embodiments, the traffic level may be determined based on at least one of: a network-transmitted traffic level indicator; a network command; a status of a timer maintained at the UE; or a buffer status of the UE. At block 1840, it may be determined whether the traffic level satisfies a threshold. When it is determined that the traffic level satisfies the threshold, the method 1800 may continue at block 1805. When it is determined that the traffic level does not satisfy the threshold, the method 1800 may continue at block 1845. In some embodiments, the traffic level may be compared to a first threshold when determining whether to switch from the first RRC connected state to the second RRC connected state, and the traffic level may be compared to a second threshold when determining whether to switch from the second RRC connected state to the first RRC connected state. The operation(s) at block 1835 or 1840 may be performed using the wireless communication management module 620 described with reference to FIG. 6, 7, 12, or 15, or the traffic level determination module 750 described with reference to FIG. 7.

At block 1845, the UE may enter or remain in a second RRC connected state with the network. In some embodiments, the second RRC connected state may be associated with a second DRX cycle. The second DRX cycle may differ from the first DRX cycle, and in some embodiments, the second DRX cycle may be longer than the first DRX cycle. The operation(s) at block 1845 may be performed using the wireless communication management module 620 described with reference to FIG. 6, 7, 12, or 15, or the RRC connection management module 715 described with reference to FIG. 7.

At block 1850, and when operating in the second RRC connected state, the UE may transmit a connected state pilot signal (e.g., an SRS) according to the second DRX cycle. The connected state pilot signal transmitted may be transmitted using resources (e.g., time and frequency resources) identified by the network for the UE, and may include an identifier of the UE. The operation(s) at block 1850 may be performed using the wireless communication management module 620 described with reference to FIG. 6, 7, 12, or 15, or the pilot signal transmission management module 645 described with reference to FIG. 6 or 7.

At block 1855, and when operating in the second RRC connected state, the UE may monitor a grant channel for the identifier of the UE. The grant channel may carry, for example, a paging signal for the UE. The operation(s) at block 1855 may be performed using the wireless communication management module 620 described with reference to FIG. 6, 7, 12, or 15, or the grant management module 735 described with reference to FIG. 7.

At block 1860, and when operating in the second RRC connected state, the UE may measure a keep alive signal received from the network. The UE may determine, based at least in part on a measurement of the keep alive signal, whether to perform a constellation reselection (e.g., at block 1825). The operation(s) at block 1860 may be performed using the wireless communication management module 620 described with reference to FIG. 6, 7, 12, or 15, or the measurement module 740 described with reference to FIG. 7.

In some embodiments of the method 1800, and in addition or alternatively to any constellation reselection performed at block 1830, the method 1800 may include receiving a reselection command from the network, and selecting, in response to the reselection command, a new constellation.

Thus, the method 1800 may provide for wireless communication. It should be noted that the method 1800 is just one implementation and that the operations of the method 1800 may be rearranged or otherwise modified such that other implementations are possible.

Figure 19:
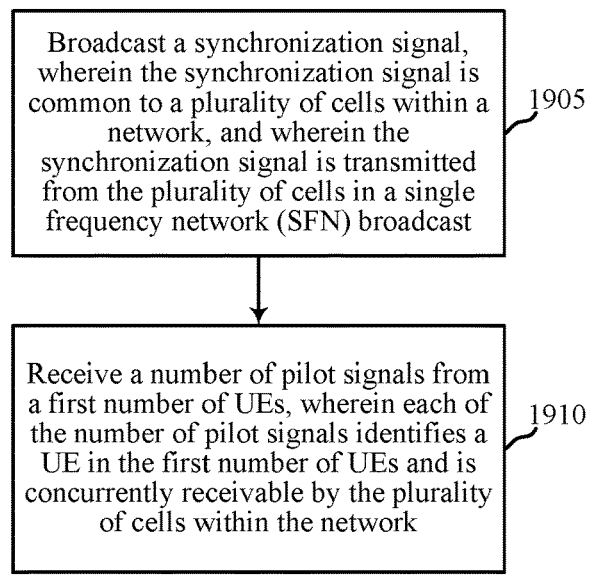
FIG. 19 is a flow chart illustrating an example of a method for wireless communication at a base station, in accordance with various aspects of the present disclosure.

FIG. 19 is a flow chart illustrating an example of a method 1900 for wireless communication at a base station, in accordance with various aspects of the present disclosure. For clarity, the method 1900 is described below with reference to aspects of one or more of the base stations 105 described with reference to FIG. 1, 8, 9, 13, or 15. In some examples a base station may execute one or more sets of codes to control the functional elements of the base station to perform the functions described below.

At block 1905, a base station may broadcast a synchronization signal. The synchronization signal may be common (e.g., non-cell specific) to a plurality of cells within a network, and may be received from at least one of the plurality of cells (e.g., from at least one of a plurality of base stations in the cells) as a SFN broadcast. The synchronization signal need not include a cell identifier. In some examples, the synchronization signal may be a periodic signal. In some embodiments, the synchronization signal may include system information request (e.g., SIB request) configuration information. The configuration information may, in some examples, include at least one of an indication of a SIB request bandwidth, an indication of a SIB request timing (e.g., slot/symbol timing), a portion of a constellation identifier, or network access barring information (e.g., an indication of times when UEs of particular types may not transmit a SIB request). The operation(s) at block 1905 may be performed using the wireless communication management module 820 described with reference to FIG. 8, 9, 13, or 15, or the synchronization signal broadcast module 835 described with reference to FIG. 8 or 9.

At block 1910, the base station may receive a number of pilot signals from a first number of UEs. Each of the number of pilot signals may identify a UE in the first number of UEs and be concurrently receivable by the plurality of cells within the network. The operation(s) at block 1910 may be performed using the wireless communication management module 820 described with reference to FIG. 8, 9, 13, or 15, or the pilot signal reception management module 840 described with reference to FIG. 8 or 9.

Thus, the method 1900 may provide for wireless communication. It should be noted that the method 1900 is just one implementation and that the operations of the method 1900 may be rearranged or otherwise modified such that other implementations are possible.

Figure 20:
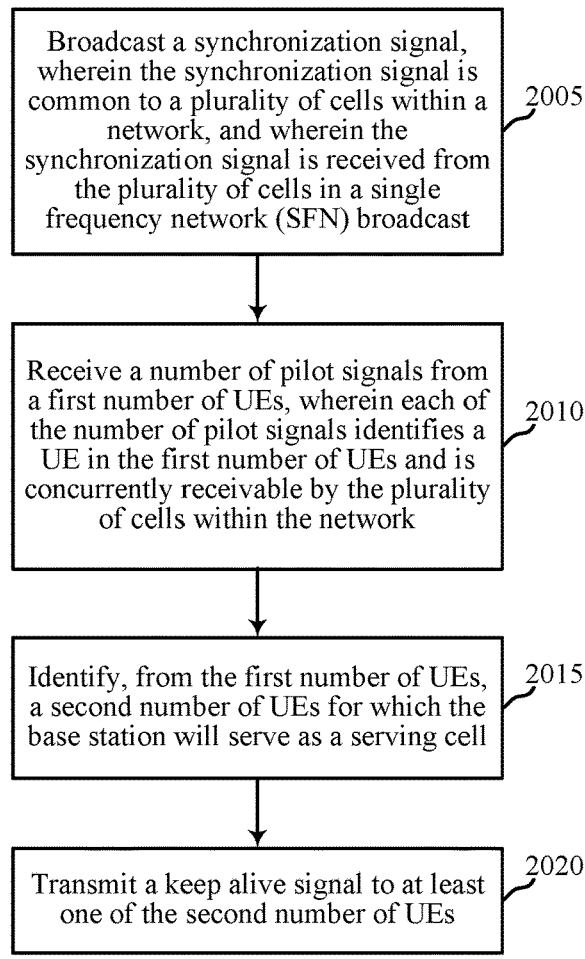
FIG. 20 is a flow chart illustrating an example of a method for wireless communication at a base station, in accordance with various aspects of the present disclosure.

FIG. 20 is a flow chart illustrating an example of a method 2000 for wireless communication at a base station, in accordance with various aspects of the present disclosure. For clarity, the method 2000 is described below with reference to aspects of one or more of the base stations 105 described with reference to FIG. 1, 8, 9, 13, or 15. In some examples a base station may execute one or more sets of codes to control the functional elements of the base station to perform the functions described below.

At block 2005, a base station may broadcast a synchronization signal. The synchronization signal may be common (e.g., non-cell specific) to a plurality of cells within a network, and may be received from at least one of the plurality of cells (e.g., from at least one of a plurality of base stations in the cells) as a SFN broadcast. The synchronization signal need not include a cell identifier. In some examples, the synchronization signal may be a periodic signal. In some embodiments, the synchronization signal may include system information request (e.g., SIB request) configuration information. The configuration information may, in some examples, include at least one of an indication of a SIB request bandwidth, an indication of a SIB request timing (e.g., slot/symbol timing), a portion of a constellation identifier, or network access barring information (e.g., an indication of times when UEs of particular types may not transmit a SIB request). The operation(s) at block 2005 may be performed using the wireless communication management module 820 described with reference to FIG. 8, 9, 13, or 15, or the synchronization signal broadcast module 835 described with reference to FIG. 8 or 9.

At block 2010, the base station may receive a number of pilot signals from a first number of UEs. Each of the number of pilot signals may identify a UE in the first number of UEs and be concurrently receivable by the plurality of cells within the network. The operation(s) at block 2010 may be performed using the wireless communication management module 820 described with reference to FIG. 8, 9, 13, or 15, or the pilot signal reception management module 840 described with reference to FIG. 8 or 9.

At block 2015, the base station may identify, from the first number of UEs, a second number of UEs for which the base station will serve as a serving cell. In some embodiments, the second number of UEs may be identified locally at the base station, or in a distributed manner by the plurality of cells. In some embodiments, the second number of UEs may be identified by transmitting information corresponding to the number of pilot signals to a central node, and receiving an indication of the second number of UEs from the central node. The operation(s) at block 2015 may be performed using the wireless communication management module 820 described with reference to FIG. 8, 9, 13, or 15, or the serving cell management module 905 described with reference to FIG. 9.

At block 2020, and when one or more of the second number of UEs is operating in the second RRC connected state described with reference to FIG. 18, the base station may transmit a keep alive signal to the one or more of the second number of UEs. In some examples, different keep alive signals may be transmitted to different UEs. The operation(s) at block 2020 may be performed using the wireless communication management module 820 described with reference to FIG. 8, 9, 13, or 15, or the keep alive signal module 910 described with reference to FIG. 9.

In some embodiments of the method 2000, the base station may allocate an active set of resources or paging area to monitor the UE's mobility or traffic, and may alone, or in combination with other base stations or a central node, maintain an active context for the UE until the UE leaves the network.

Thus, the method 2000 may provide for wireless communication. It should be noted that the method 2000 is just one implementation and that the operations of the method 2000 may be rearranged or otherwise modified such that other implementations are possible.

Figure 21:
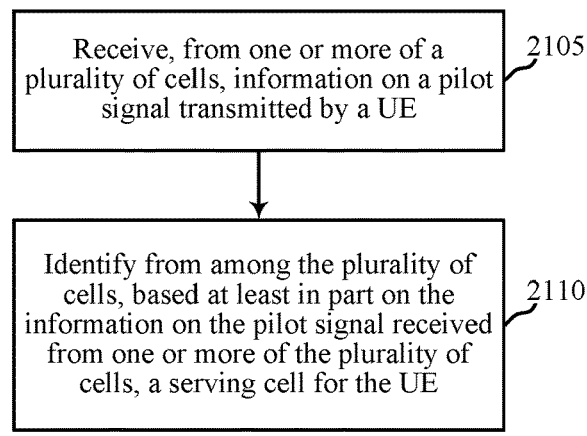
FIG. 21 is a flow chart illustrating an example of a method for managing wireless communication at a central node, in accordance with various aspects of the present disclosure.

FIG. 21 is a flow chart illustrating an example of a method 2100 for managing wireless communication at a central node, in accordance with various aspects of the present disclosure. For clarity, the method 2100 is described below with reference to aspects of one or more of the central nodes 1005 described with reference to FIG. 10, 11, or 14. In some examples a central node may execute one or more sets of codes to control the functional elements of the central node to perform the functions described below.

At block 2105, a central node may receive, from each of a plurality of cells, information on a pilot signal transmitted by a UE. The operation(s) at block 2105 may be performed using the wireless communication management module 1020 described with reference to FIG. 10, 11, or 14, or the pilot signal information management module 1035 described with reference to FIG. 10 or 11.

At block 2110, the central node may identify, from among the plurality of cells, and based at least in part on the information on the pilot signal received from one or more of the plurality of cells, a serving cell for the UE. The operation(s) at block 2110 may be performed using the wireless communication management module 1020 described with reference to FIG. 10, 11, or 14, or the serving cell identification module 1040 described with reference to FIG. 10 or 11.

Thus, the method 2100 may provide for wireless communication. It should be noted that the method 2100 is just one implementation and that the operations of the method 2100 may be rearranged or otherwise modified such that other implementations are possible.

Figure 22:
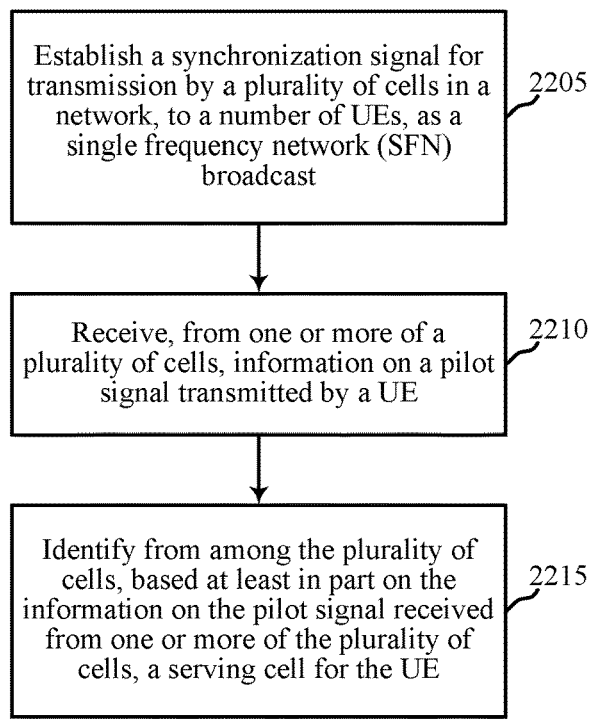
FIG. 22 is a flow chart illustrating an example of a method for managing wireless communication at a central node, in accordance with various aspects of the present disclosure.

FIG. 22 is a flow chart illustrating an example of a method 2200 for managing wireless communication at a central node, in accordance with various aspects of the present disclosure. For clarity, the method 2200 is described below with reference to aspects of one or more of the central nodes 1005 described with reference to FIG. 10, 11, or 14. In some examples a central node may execute one or more sets of codes to control the functional elements of the central node to perform the functions described below.

At block 2205, a central node may establish a synchronization signal for transmission by a plurality of cells in a network, to a number of UEs. The synchronization signal may be common (e.g., non-cell specific) to the plurality of cells. and may be received from at least one of the plurality of cells (e.g., from at least one of a plurality of base stations in the cells) as a SFN broadcast. The synchronization signal need not include a cell identifier. In some examples, the synchronization signal may be a periodic signal. In some embodiments, the synchronization signal may include system information request (e.g., SIB request) configuration information. The configuration information may, in some examples, include at least one of an indication of a SIB request bandwidth, an indication of a SIB request timing (e.g., slot/symbol timing), a portion of a constellation identifier, or network access barring information (e.g., an indication of times when UEs of particular types may not transmit a SIB request). The operation(s) at block 2205 may be performed using the wireless communication management module 1020 described with reference to FIG. 10, 11, or 14, or the synchronization signal management module 1105 described with reference to FIG. 11.

At block 2210, the central node may receive, from each of the plurality of cells, information on a pilot signal transmitted by a UE. The operation(s) at block 2210 may be performed using the wireless communication management module 1020 described with reference to FIG. 10, 11, or 14, or the pilot signal information management module 1035 described with reference to FIG. 10 or 11.

At block 2215, the central node may identify, from among the plurality of cells, and based at least in part on the information on the pilot signal received from one or more of the plurality of cells, a serving cell for the UE. The operation(s) at block 2215 may be performed using the wireless communication management module 1020 described with reference to FIG. 10, 11, or 14, or the serving cell identification module 1040 described with reference to FIG. 10 or 11.

Thus, the method 2200 may provide for wireless communication. It should be noted that the method 2200 is just one implementation and that the operations of the method 2200 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication at a user equipment (UE), comprising:
   receiving a synchronization signal, wherein the synchronization signal is common to a plurality of cells within a network, and wherein the synchronization signal comprises information common to the plurality of cells;
   acquiring a timing of the network based on the synchronization signal;
   transmitting an uplink communication signal after acquiring the timing of the network; and
   receiving, after transmitting the uplink communication signal, unicast system information for the UE comprising at least one of:
   an on-demand system information block (SIB), or an on-demand master information block (MIB).

2. The method of claim 1, wherein the uplink communication signal is concurrently receivable by the plurality of cells within the network.

3. The method of claim 1, wherein the uplink communication signal comprises a spatial signature.

4. The method of claim 1, further comprising:
   receiving, in response to transmitting the uplink communication signal, at least one of an uplink allocation for the UE, or a downlink control channel message.

5. The method of claim 4, further comprising:
   transmitting a radio resource control (RRC) connection request to the network in response to receiving at least one of: the unicast system information or the uplink allocation for the UE.

6. The method of claim 1, wherein the synchronization signal comprises system information request configuration information that indicates at least one of a SIB request occasion, a portion of a constellation identifier, or network access barring information.

7. The method of claim 6, wherein the uplink communication signal is transmitted in the indicated SIB request occasion.

8. The method of claim 1, wherein the synchronization signal is received as a single frequency network (SFN) broadcast.

9. The method of claim 1, further comprising:
   entering a radio resource control (RRC) connected state with the network subsequent to acquiring the timing of the network.

10. The method of claim 9, wherein the RRC connected state comprises a first RRC connected state in a plurality of RRC connected states, and wherein the plurality of RRC connected states comprises a second RRC connected state, the method further comprising:
    switching between at least the first RRC connected state and the second RRC connected state based at least in part on a determined traffic level.

11. The method of claim 9, further comprising:
    receiving from the network a reselection command;
    selecting, in response to the reselection command, a new constellation; and
    transmitting the uplink communication signal in response to a second synchronization signal received from the new constellation.

12. A device for wireless communication at a user equipment (UE), comprising:
    means for receiving a synchronization signal, wherein the synchronization signal is common to a plurality of cells within a network, and wherein the synchronization signal comprises information common to the plurality of cells;
    means for acquiring a timing of the network based on the synchronization signal;
    means for transmitting an uplink communication signal after acquiring the timing of the network; and
    means for receiving, after transmitting the uplink communication signal, unicast system information for the UE comprising at least one of:
    an on-demand system information block (SIB), or an on-demand master information block (MIB).

13. The device of claim 12, wherein the uplink communication signal is concurrently receivable by the plurality of cells within the network.

14. The device of claim 12, wherein the uplink communication signal comprises a spatial signature.

15. The device of claim 12, further comprising:
    means for receiving, in response to transmitting the uplink communication signal, at least one of an uplink allocation for the UE, or a downlink control channel message.

16. The device of claim 15, further comprising:
    means for transmitting a radio resource control (RRC) connection request to the network in response to receiving at least one of: the unicast system information or the uplink allocation for the UE.

17. The device of claim 12, wherein the synchronization signal comprises system information request configuration information that indicates at least one of a SIB request occasion, a portion of a constellation identifier, or network access barring information.

18. The device of claim 12, further comprising:
means for entering a radio resource control (RRC) connected state with the network subsequent to acquiring the timing of the network.

19. A device for wireless communication at a user equipment (UE), comprising a processor, memory in electronic communication with the processor, and instructions stored in the memory, the instructions being executable by the processor to:
receive a synchronization signal, wherein the synchronization signal is common to a plurality of cells within a network, and wherein the synchronization signal comprises information common to the plurality of cells;
acquire a timing of the network based on the synchronization signal;
transmit an uplink communication signal after acquiring the timing of the network; and
receive, after transmitting the uplink communication signal, unicast system information for the UE comprising at least one of:
an on-demand system information block (SIB), or an on-demand master information block (MIB).

20. The device of claim 19, wherein the uplink communication signal is concurrently receivable by the plurality of cells within the network.

21. The device of claim 19, wherein the uplink communication signal comprises a spatial signature.

22. The device of claim 19, wherein the instructions are executable by the processor to:
receive, in response to transmitting the uplink communication signal, at least one of an uplink allocation for the UE, or a downlink control channel message.

23. The device of claim 22, wherein the instructions are executable by the processor to:
transmit a radio resource control (RRC) connection request to the network in response to receiving at least one of: the unicast system information or the uplink allocation for the UE.

24. The device of claim 19, wherein the synchronization signal comprises system information request configuration information that indicates at least one of a SIB request occasion, a portion of a constellation identifier, or network access barring information.

25. The device of claim 19, wherein the instructions are executable by the processor to:
enter a radio resource control (RRC) connected state with the network subsequent to acquiring the timing of the network.

26. A non-transitory computer-readable medium storing computer-executable code for wireless communication at a user equipment (UE), the code executable by a processor to:
receive a synchronization signal, wherein the synchronization signal is common to a plurality of cells within a network, and wherein the synchronization signal comprises information common to the plurality of cells;
acquire a timing of the network based on the synchronization signal;
transmit an uplink communication signal after acquiring the timing of the network; and
receive, after transmitting the uplink communication signal, unicast system information for the UE comprising at least one of:
an on-demand system information block (SIB), or an on-demand master information block (MIB).

* * * * *